United States Patent [19]
Kawahata et al.

[11] Patent Number: 6,011,530
[45] Date of Patent: Jan. 4, 2000

[54] LIQUID CRYSTAL DISPLAY

[75] Inventors: Ken Kawahata; Tatsumi Fujiyoshi, both of Miyagi-ken, Japan

[73] Assignee: Frontec Incorporated, Miyagi-Ken, Japan

[21] Appl. No.: 08/840,108

[22] Filed: Apr. 4, 1997

[30] Foreign Application Priority Data

Apr. 12, 1996 [JP] Japan .................................. 8-091560

[51] Int. Cl.$^7$ ...................................................... G09G 3/36
[52] U.S. Cl. .............................. 345/90; 345/92; 345/212; 349/48
[58] Field of Search ............................... 345/58, 103, 92, 345/90, 212, 127, 100; 349/48

[56] References Cited

U.S. PATENT DOCUMENTS

| | | | |
|---|---|---|---|
| 4,803,480 | 2/1989 | Soneda et al. | 345/90 |
| 4,870,396 | 9/1989 | Shields | 345/90 |
| 5,627,557 | 5/1997 | Yamaguchi et al. | 345/90 |
| 5,844,535 | 12/1998 | Itoh et al. | 345/92 |

FOREIGN PATENT DOCUMENTS 5-30352  5/1993  Japan .

*Primary Examiner*—Dennis-Doon Chow
*Assistant Examiner*—Amr Awad
*Attorney, Agent, or Firm*—Brinks Hofer Gilson & Lione

[57] ABSTRACT

To provide a liquid crystal display making it possible to decrease the number of signal lines to avoid narrowing the pitch of the terminal portion of a data driver and to decrease power consumption and cost.

Control lines CA and CB are used which are arranged in parallel with signal lines Dj on both sides of each signal line Dj to switch on/off switching devices $T_{CA}$ and $T_{CB}$ connected in series with the switching device $T_G$ of each pixel switched on/off by control signals in these control lines CA and CB and selects pixels in which image data is written. In this case, the level of a control signal is changed to H/L for each field or each horizontal scanning line and moreover, the polarity of an image signal to be supplied to the signal line Dj is properly changed. Furthermore, a cancel signal for controlling fluctuation in counter electrode potentials is superimposed on a control signal.

14 Claims, 36 Drawing Sheets

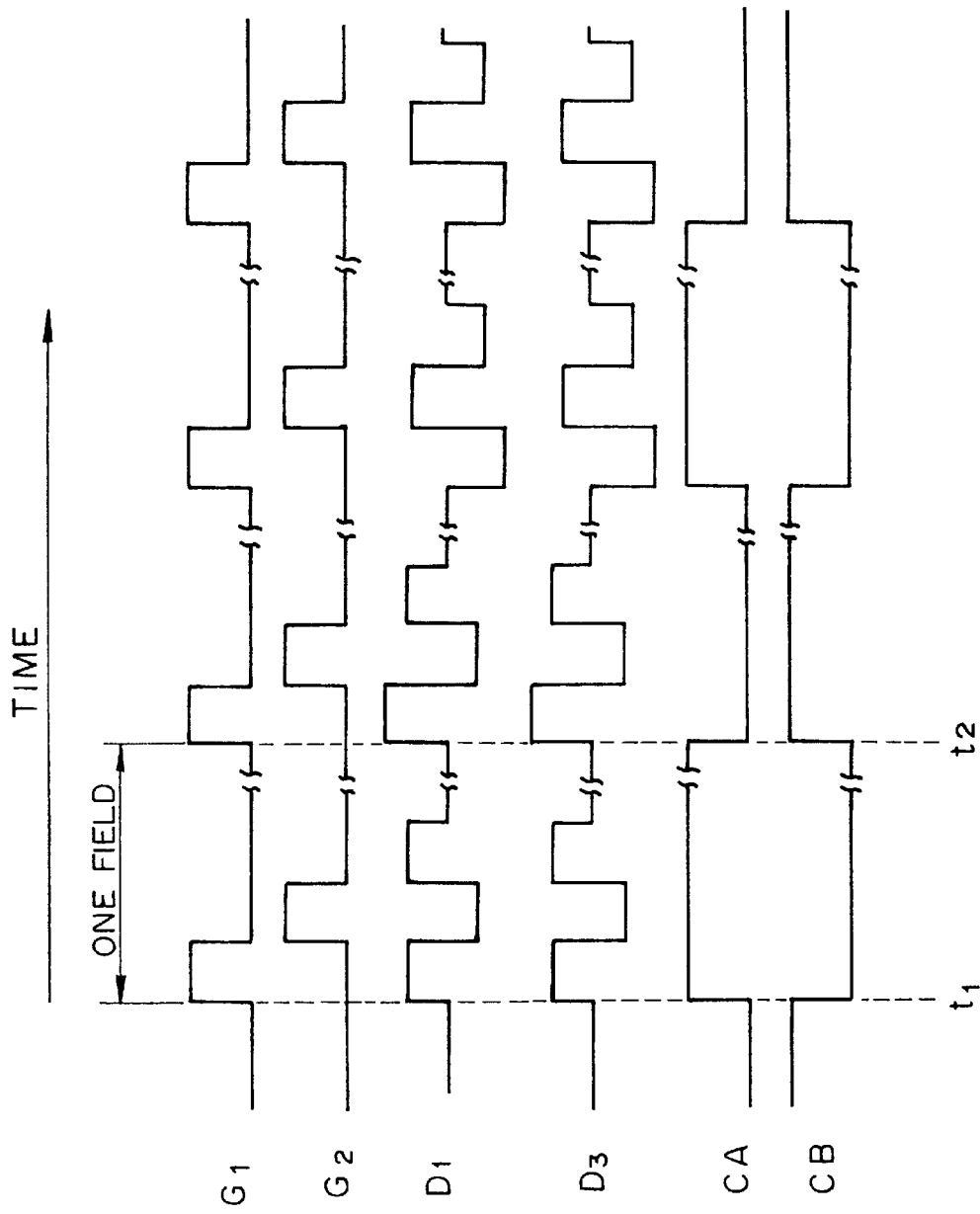

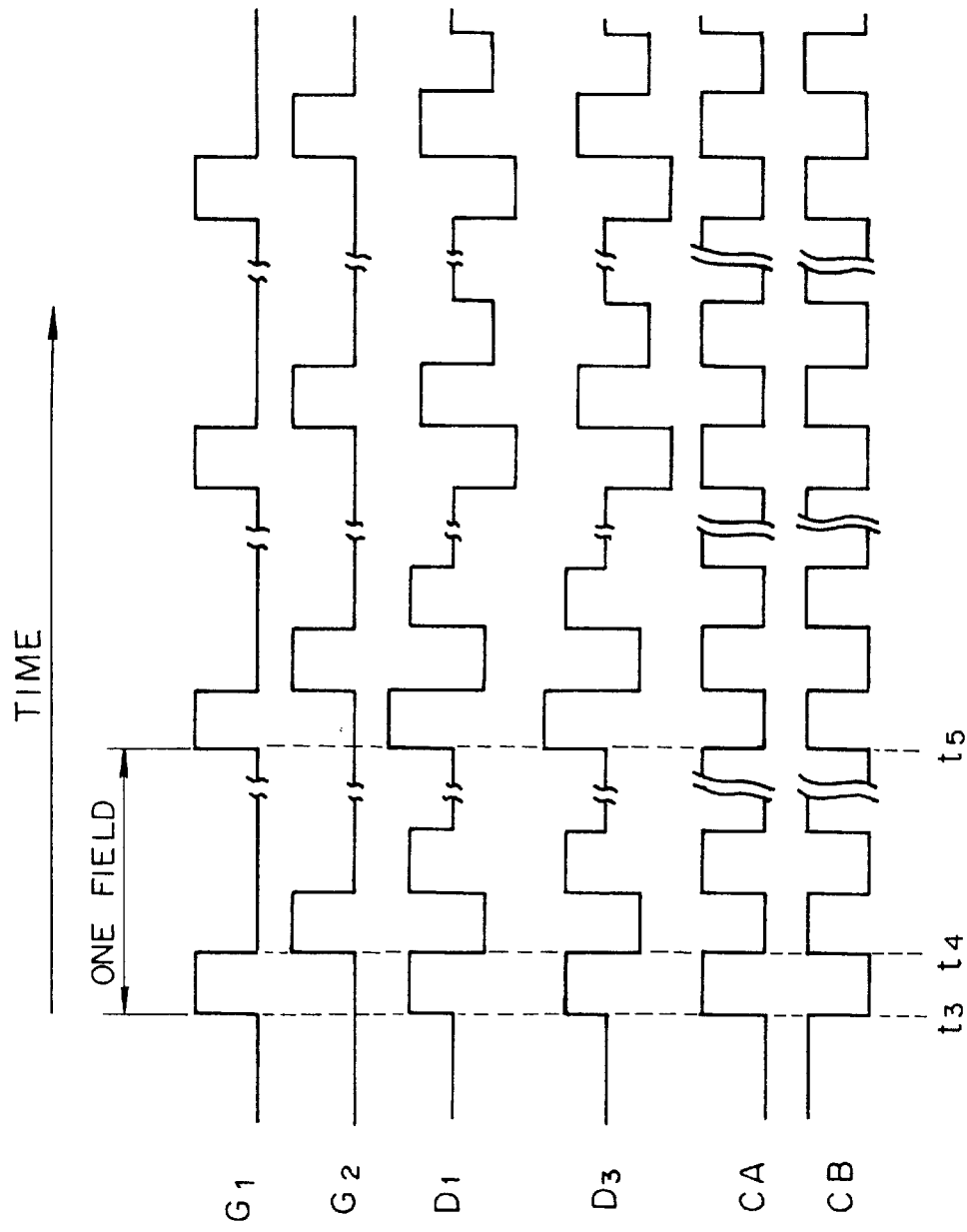

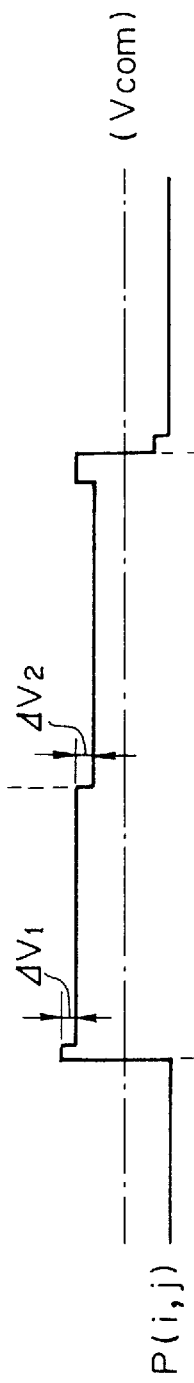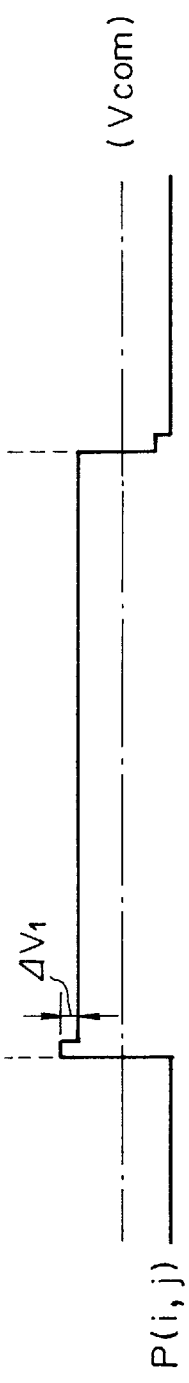

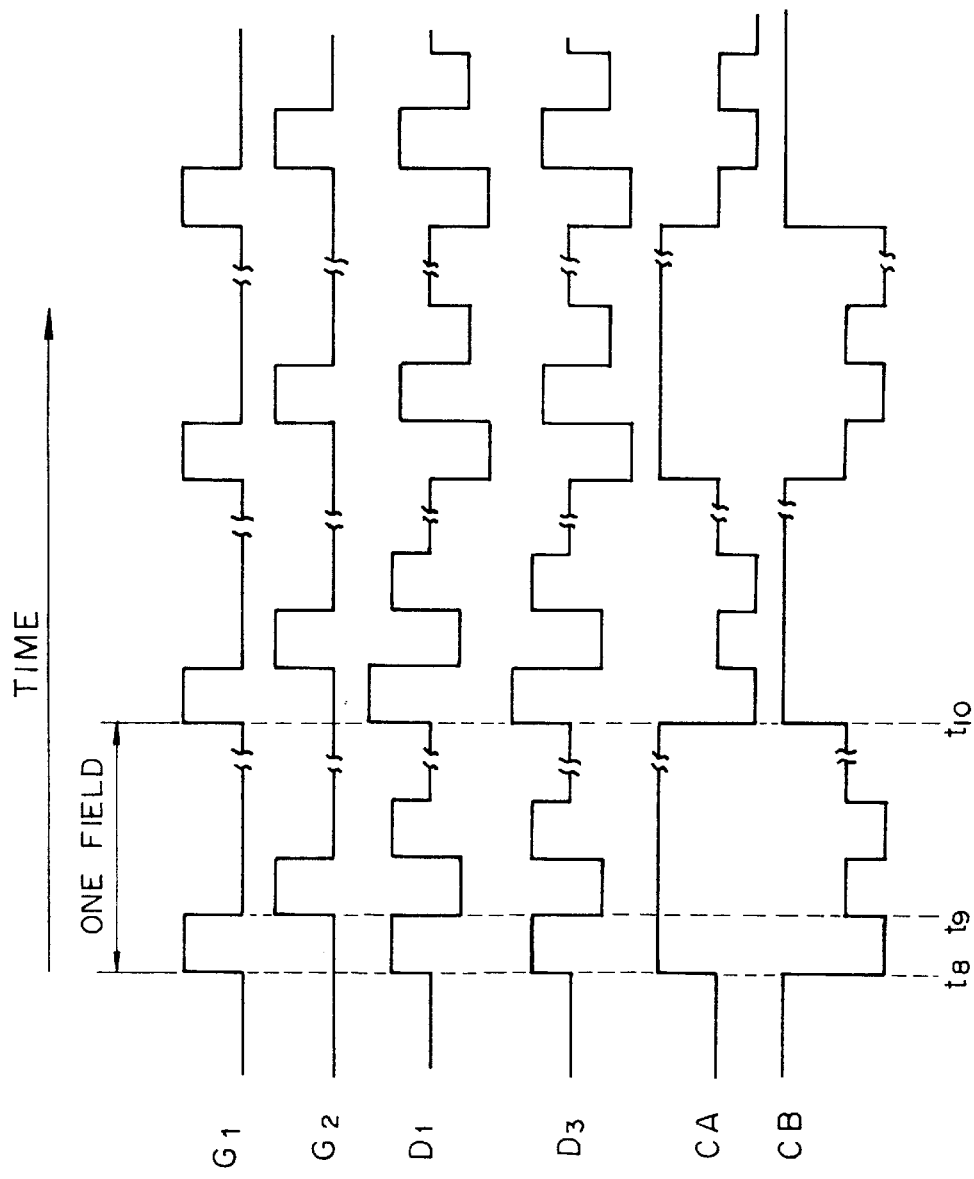

LIQUID CRYSTAL DISPLAY

BACKGROUND OF THE INVENTION

1. Field of the Invention

The present invention relates to a liquid crystal display comprising fewer signal lines for driving pixels.

2. Description of Related Art

FIG. 37 is an illustration showing the structure of a conventional liquid crystal display. In FIG. 37 symbol 1 denotes a liquid crystal panel in which r scanning lines of G1 to Gr and s signal lines of D1 to Ds are arranged like a matrix and thin-film transistors T, T, . . . are formed one at each intersection between the scanning lines G1 to Gr on one hand and the signal lines D1 to Ds on the other. Moreover, each liquid crystal layers L, L, . . . is driven by turning on/off each of the transistors T, T, . . . Furthermore, symbol 2 denotes a gate driver for driving the scanning lines G1 to Gr and 3 denotes a data driver for driving the signal lines D1 to Ds. FIG. 38 is an illustration showing the timing for driving the scanning lines G1 to Gr and the signal lines D1 to Ds.

In the case of the above structure, horizontal pixel lines are driven in order starting with the first line by successively turning on the scanning lines G1 to Gr and thereby, display is performed. Moreover, the pixel lines may be driven by the interlaced scanning method according to the NTSC standard.

Therefore, in the case of an active-matrix liquid crystal display having r scanning lines of G1 to Gr and s signal lines of D1 to Ds, a gate driver having r outputs and a data driver 3 having s outputs are necessary on the outside of the liquid crystal display 1. This is because carriers in amorphous silicon necessary for the thin-film transistors T, T, . . . have small mobility and thus, it is impossible to form a high-speed circuit for driving the scanning lines G1 to Gr or signal lines D1 to Ds in the liquid crystal panel 1.

To improve the definition of a display screen (improvement of resolution), increasing the number of the signal lines D1 to Ds causes pitch between terminal portions to narrow, the number of data drivers to increase, and power consumption to increase. An example of forming some functional pieces of a data driver with amorphous silicon is also reported. In this case, however, a complex external circuit to generate tens of multiplexing signals results in increased cost as a whole.

Moreover, to decrease power consumption, the voltage of a driver is lowered. Therefore, a method for reversing a counter electrode (common reversal driving) is used. In the case of this method, however, it is necessary to write signals at the same polarity under scanning. Therefore, the problem of crosstalk due to capacitive coupling between a signal line and a counter electrode is pointed out.

The present invention is made to solve the above problems and its object is to provide a liquid crystal display making it possible to avoid narrowing the pitch between terminal portions of a data driver by decreasing the number of signal lines and to reduce power consumption and cost.

Moreover, it is another object of the present invention to provide a liquid crystal display making it possible to prevent contrast from deteriorating and the crosstalk from increasing even if common reversal driving is used.

SUMMARY OF THE INVENTION

To solve the above problems, the present invention comprises a first switching device provided correspondingly to a plurality of scanning lines and a plurality of signal lines formed like a matrix, control lines provided alternately with and in parallel with the signal lines, and regions enclosed by adjacent signal lines, and the control lines, and adjacent scanning lines, connected to the scanning lines and the signal lines, and turned on by a drive signal supplied to the scanning lines to apply a signal supplied to the signal lines to liquid crystals; and a second switching device connected to the first switching device in series and switched on/off by a signal supplied to the control lines.

The present invention makes it possible to select a pixel in which image data is written by a signal supplied to a control line because first switching devices are used which correspond to a plurality of scanning lines, which are turned on by a drive signal supplied to each scanning line, and which supply a signal supplied to each control line to second switching devices and the second switching devices are switched on/off by a signal supplied to each control line provided in parallel with each signal line.

The control lines are provided alternately with the signal lines, an n-th control line (in this case, it is assumed that n is an odd number) is connected in common and an m-th control line (in this case, it is assumed that m is an even number other than 0 and equals n+1) is connected in common, and the m-th control line and the n-th control line are alternately driven every image display unit.

Moreover, it is permitted to use a structure in which the control lines are provided alternately with the signal lines, an n-th control line is connected in common and an m-th control line is connected in common, and the n-th control line and the m-th control line are alternately driven whenever driving of the scanning lines is shifted.

Furthermore, it is permitted to use a structure in which the control lines are provided alternately with the signal lines, an n-th control line is connected in common and an m-th control line is connected in common, the n-th control line and the m-th control line are alternately driven every image display unit, and adjacent signal lines are driven by signals at different polarities.

Furthermore, the present invention is characterized by superimposing a voltage for disabling a potential based on the signal lines on the control lines.

Furthermore, the present invention is characterized by calculating the average value of the voltages to be applied to the signal lines and superposing a voltage based on the average value on the control lines.

Furthermore, the present invention is characterized by including a holding capacitance provided between the second switching device provided between the n-th control line and the signal lines and the m-th control line and a holding capacitance provided between the second switching device provided between the m-th control line and the signal lines and the n-th control line.

Furthermore, the present invention is characterized by including a first switching device provided correspondingly to a plurality of scanning lines and a plurality of signal lines formed like a matrix, control lines formed alternately with and in parallel with the signal lines, and a region enclosed by adjacent signal lines and the control lines and adjacent scanning lines, connected to the control lines and a pixel electrode in the region, and switched on/off by the control lines, at least two first switching devices present in the region enclosed by the adjacent control lines and the adjacent scanning lines, and a second switching device connected to either of the adjacent scanning lines and the signal line between the adjacent control lines and turned on by a drive signal supplied to the adjacent scanning lines to supply a signal sent from the adjacent signal lines to at least the two first switching devices.

According to the present invention, because a control parallel with a signal is provided for a liquid crystal panel and a second switching device and two switching devices are set correspondingly to each other, there are advantages that a pixel can be selected in which image data is written by a signal supplied to the control line and the manufacturing yield can be improved.

Moreover, advantages can be obtained that the number of signals corresponding to the number of pixels can be decreased and the narrowing of pitch between terminal portions of a data driver can be avoided.

Furthermore, because the number of signal lines can be decreased, advantages can be obtained that the power consumption can be reduced, increasing the size of a liquid crystal display can be avoided, and the cost of the liquid crystal display can be greatly decreased.

Furthermore, it is permitted to use a structure in which the control lines are provided alternately with the signal lines, an n-th control line (in this case, it is assumed that n is an odd number) is connected in common and an m-th control line (in this case, it is assumed that m is an even number other than 0 and equals n+1) is connected in common, and the m-th control line and the n-th control line are alternately driven every image display unit.

Furthermore, it is permitted to use a structure in which the control lines are provided alternately with the signal lines, an n-th control line is connected in common and an m-th control line is connected in common, and the n-th control line and the m-th control line are alternately driven whenever drive of the scanning lines is shifted.

Furthermore, it is permitted to use a structure in which the control lines are provided alternately with the signal lines, an n-th control line is connected in common and an m-th control line is connected in common, the n-th control line and the m-th control line are alternately driven every image display unit, and adjacent signal lines are driven by signals with different polarities.

Furthermore, the present invention is characterized by superimposing a voltage for disabling a potential based on the signal lines on the control lines.

Furthermore, it is permitted to compute an average value of the voltages to be applied to the signal lines and superimpose a voltage based on the average value on the control lines.

Furthermore, the present invention is characterized by including a holding capacitance provided between the second switching device provided between the n-th control line and the signal lines and the m-th control line and a holding capacitance provided between the second switching device provided between the m-th control line and the signal lines and the n-th control line.

BRIEF DESCRIPTION OF THE DRAWINGS

FIG. 2 is an illustration showing the generation mode of each signal in the first mode of one embodiment;

FIG. 5 is an illustration showing the generation mode of each signal in the second mode of one embodiment;

FIGS. 10A, 10B, and 10C are illustrations showing the fluctuation in pixel potentials, in which FIGS. 10A and 10B are illustrations same as those in the first mode of one embodiment and FIG. 10C is an illustration showing the fluctuation in pixel potentials in the third mode of one embodiment of the present invention;

FIGS. 28A, 28B, and 28C are illustrations showing the fluctuation in pixel potentials, in which FIGS. 28A and 28B are illustrations same as that of the first mode of another embodiment and FIG. 28C is an illustration showing the fluctuation in pixel potentials of the third mode of another embodiment of the present invention;

FIG. 31 is an illustration showing the generation mode of each signal in the fifth mode of another embodiment;

DESCRIPTION OF THE PREFERRED EMBODIMENTS

One Embodiment

Figure 1:
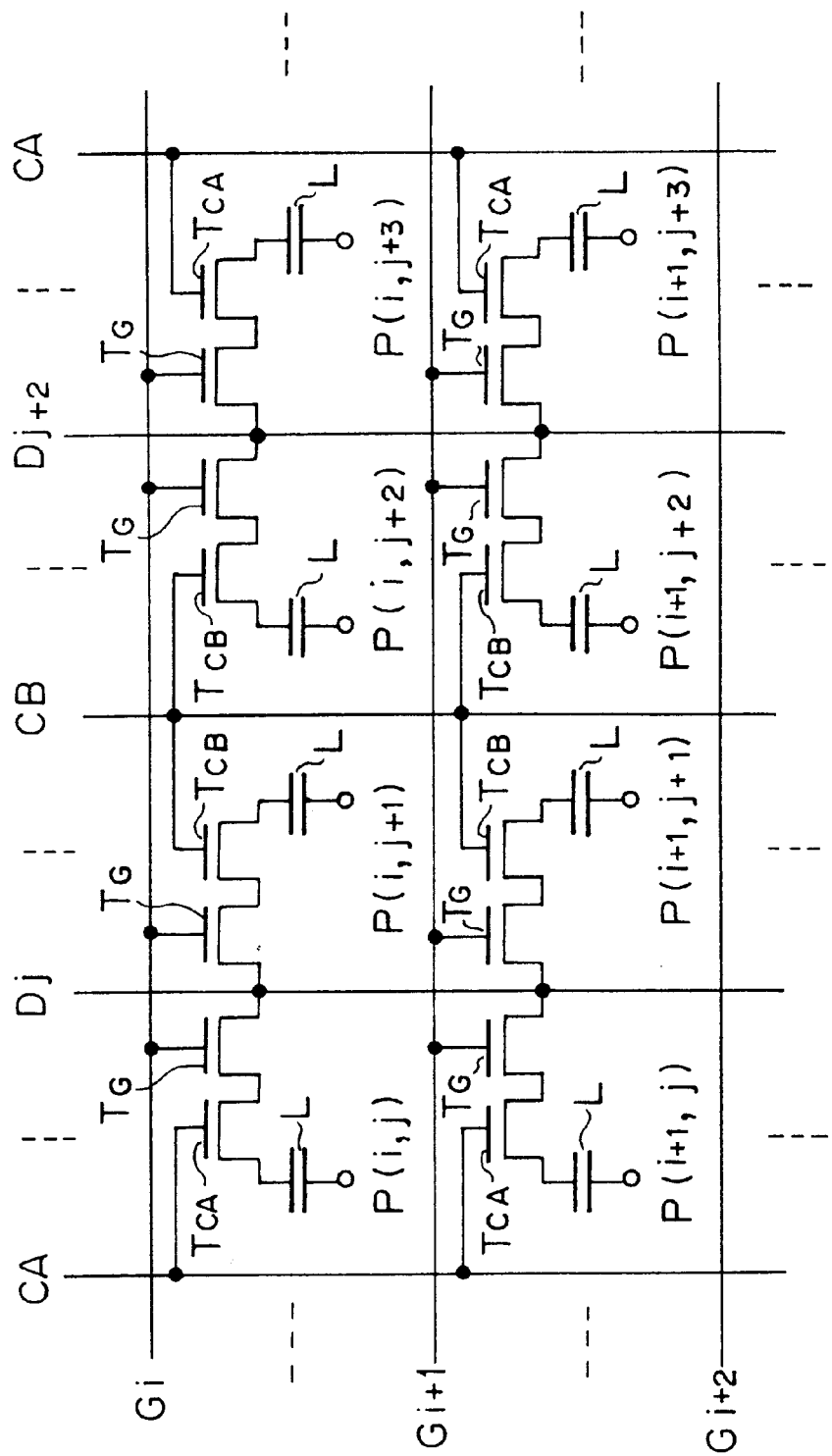
FIG. 1 is an illustration showing the structure of a liquid crystal panel of the liquid crystal display of one embodiment of the present invention.

The preferred embodiments of the present invention are described below by referring to the accompanying drawings. FIG. 1 is an illustration showing the structure of a liquid crystal panel of the liquid crystal display of an embodiment of the present invention. This illustration shows the constitution of pixels at a part of the liquid crystal panel in which n pixels having the illustrated structure are horizontally arranged and m pixels having the structure are vertically arranged like a matrix. Moreover, a gate driver for driving scanning lines and a data driver for driving signal lines are provided in the margin of the liquid crystal panel (see FIG. 3).

In FIG. 1, symbol Gi (i=1,2, . . . , and m) denotes horizontally arranged scanning lines which transmit a gate signal output from a gate driver at a predetermined timing and drive the pixels of each row in order. Symbol Dj (j=1,3, . . . , and n-1) denotes vertically arranged signal lines which transmit image signals output from a data driver at a predetermined timing and supply the image signals to the pixels of each column.

Symbols CA and CB denote control lines arranged at both sides of each signal line Dj in parallel with the signal line Dj. These control lines CA and CB are alternately arranged as shown in FIG. 1 and either control line is set between signal lines. Moreover, the control lines CA are connected to each other in common and the control lines CB are also connected to each other in common (see FIG. 3). Each control line transmits a control signal at a predetermined timing to be described later.

P(i,j) in FIG. 1 denotes a pixel in the i-th row and j-th column. Each pixel is provided correspondingly to the intersection between each scanning line, each signal line, and each control line. That is, two pixels are arranged for one signal line and one of the two pixels is located at the control line CA side and the other is located at the control line CB side. For example, at the intersection between the scanning line Gi and the signal line Dj in FIG. 1, the pixel P(i,j) is located on the control line CA side to the left of the signal line Dj and the pixel P(i,j+1) is located on the right control line CB.

Each pixel is connected with a scanning line and provided with a switching device $T_G$ such as a TFT to be switched on/off by a gate signal and a liquid crystal layer L. Moreover, the pixel at the control line CA side is provided with a switching device $T_{CA}$ connected with the control line CA and the pixel at the control line CB side is provided with a switching device $T_{CB}$ connected with the control line CB. Moreover, the switching devices $T_{CA}$ and $T_{CB}$ are switched on/off by a control signal transmitted through the control lines CA and CB.

One electrode of each switching device $T_G$ is connected with a signal line and the other electrode is connected with one electrode of the switching device $T_{CA}$ or $T_{CB}$. According to the above structure, each signal line and each liquid crystal layer L are connected through the switching device $T_G$ and the switching device $T_{CA}$ or $T_{CB}$ in series, an image signal transmitted through a signal line in accordance with the logical product of a gate signal and a control signal is applied to the liquid crystal layer L and image data is written.

The image display operation by the above structure is described below. FIG. 2 shows a first example of the generation mode of each signal in this embodiment. In FIG. 2, symbols $G_1$ and $G_2$ denote gate signals transmitted through scanning lines $G_1$ and $G_2$, $D_1$ and $D_3$ denote image signals transmitted through signal lines $D_1$ and $D_3$, and CA and CB denote control signals transmitted through control lines CA and CB. These scanning signals $G_1$ and $G_2$ and signal lines $D_1$ and $D_3$ correspond to a case of viewing FIG. 1 as i=j=1.

First, when display of a certain display field (image display unit) is started at a time $t_1$ in FIG. 2, a control signal on the control line CA is set to H level and a control signal on the control line CB is set to L level, the switching device $T_{CA}$ is turned on, and the switching device $T_{CB}$ is turned off. Moreover, at the same time, a gate signal on the scanning line is set to H level and held for one horizontal scanning period. Thereby, the switching devices $T_G$ and $T_{CA}$ are both turned on only at pixels (P(1,1), P(1,4), . . . , P(1,j), and P(1,j+3) located at the control line CA side of the first row during one horizontal scanning period and image data supplied from a signal line are written in these pixels.

In this case, the image data is supplied by an image signal corresponding to the image data. As shown by $D_1$ and $D_3$ in FIG. 2, the image signal is supplied in accordance with a polarity which is kept in the same state during one horizontal scanning period but reversed every horizontal scanning period. The same is true for image signals supplied through other signal lines $D_5$, $D_7$, . . . which are not illustrated. Thereby, first, the image data of the first row at the time of the display operation is supplied by the positive-polarity image signal as illustrated and image data is written in the pixels of the first row and the j-th column and the first row and (j+3)-th column with positive polarity.

Then, when one horizontal scanning period passes and the gate signal on the scanning line $G_1$ becomes L-level, the gate signal on the scanning line $G_2$ is set to H level. Moreover, the control signals on the control line CA and CB hold the above state and still keep the switching device $T_{CA}$ turned on and the switching device $T_{CB}$ turned off. Thereby, the switching devices $T_G$ and $T_{CA}$ are both turned on only at pixels (P(2,1), P(2,4), ..., P(2,j), P(2,j+3), ...) located at the control line CA side of the second row and image data is written in these pixels. In this case, because the polarity of the image signal is reversed as described above, the image data of the second row is written at a polarity opposite to that of the case of the first row.

Figure 3A:
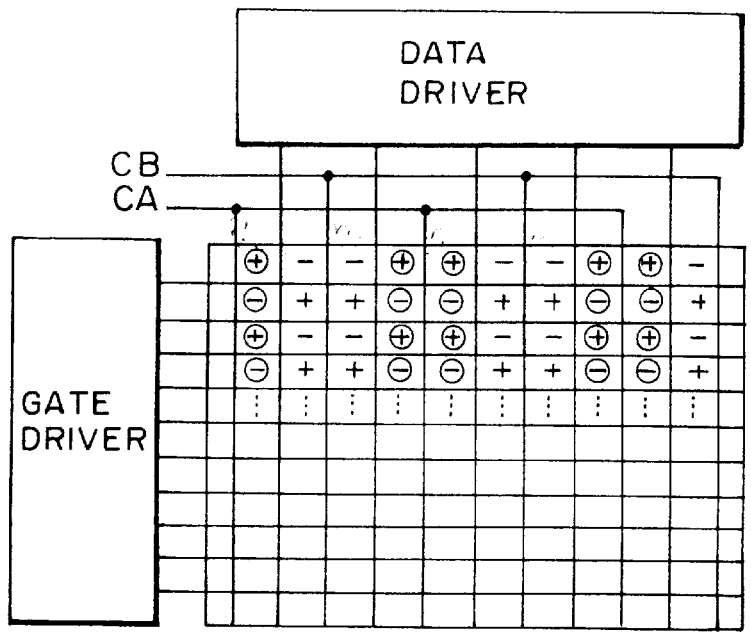
FIGS. 3A and 3B are illustrations schematically showing the pixels in which image data is written in accordance with the first mode of one embodiment.

Hereafter similarly, image data is written in the pixels of each row by setting the control signal on the control line CA to H level and the control signal on the control line CB to L level and successively setting the gate signals on the scanning lines $G_3$, $G_4$, ... to H level (not illustrated). Thereby, image data is written in pixels P(i,j) and P(i,j+3) (i=1,2, ..., and m: j=1,5, ..., and n-3) in a period between times $t_1$ and $t_2$ equivalent to one field. FIG. 3A schematically shows the pixels in which image data is written in the above manner by the image-signal polarities enclosed by a circle. The polarities not enclosed by a circle show the pixels in which image data is already written in a field before time $t_1$.

Then, at time $t_2$ in FIG. 2, display of the next display field is started, the control signal on the control line CA is set to L level, the control signal on the control line CB is set to H level, the switching device $T_{CA}$ is turned off, and the switching device $T_{CB}$ is turned on. That is, pixels P(i,j+1) and P(i,j+2) are made ready for writing image data instead of the pixels P(i,j) and P(i,j+3) in which image data is already written in the period between the times $t_1$ and $t_2$. Moreover, similar to the above described, the gate signal on the scanning line $G_1$ is first set to H level, the switching devices $T_G$ and $T_{CB}$ are turned on only at the pixels (P(1,2), P(1,3), ..., P(1,j+1), P(1,j+2), ...), and image data is written in these positive-polarity pixels.

Then, when the gate signal on the scanning line $G_1$ becomes L-level, the gate signal on the scanning line $G_2$ is set to H level. Also in this case, similar to the above mentioned, the stage of a control signal is held and image data is written with negative polarity in the pixels (P(2,2), P(2,3), ..., P(2,j+1), P(2,j+2), ...). Hereafter similarly, the gate signals on the scanning lines $G_3$, $G_4$... are set to H level (not illustrated) and image data is written in the pixels P(i,j+1) and P(i,j+2) (i=1,2, ..., and m: j=1,5, ..., and n-3).

Figure 3B:
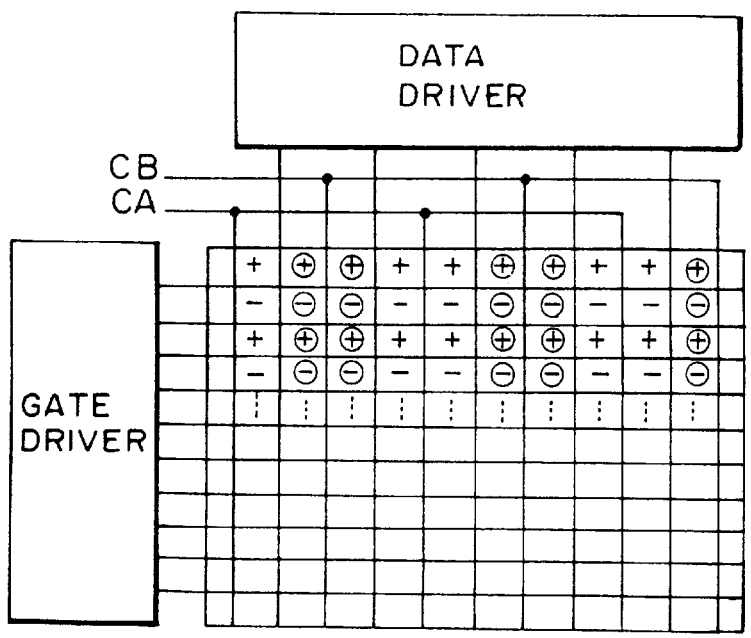

FIG. 3B schematically shows the pixels in which image data is written in the above manner. Also in FIG. 3B, the pixels in which image data is written are shown by the image-signal polarities enclosed by a circle. The polarities not enclosed by a circle show the pixels in which image data is written in a field before the time $t_2$, that is, in the above field between the times ti and $t_2$. These pixels correspond to the pixels shown by the image-signal polarities enclosed by a circle in FIG. 3A. As shown in these drawings, the polarity reversal in the case of the first mode of this embodiment is similar to 1H reversal in which a polarity is reversed every horizontal scanning period.

Hereafter, the above display operation is similarly repeated to select the pixels P(i,j) and P(i,j+3) or the pixels P(i,j+1) and P(i,j+2) and write image data. According to the above display operation, image data is written in each pixel once for two fields and each pixel is reversed in the polarity reversal which occurs once for two fields. Therefore, the polarities enclosed by the circle in FIG. 2A are generated.

Figure 4:
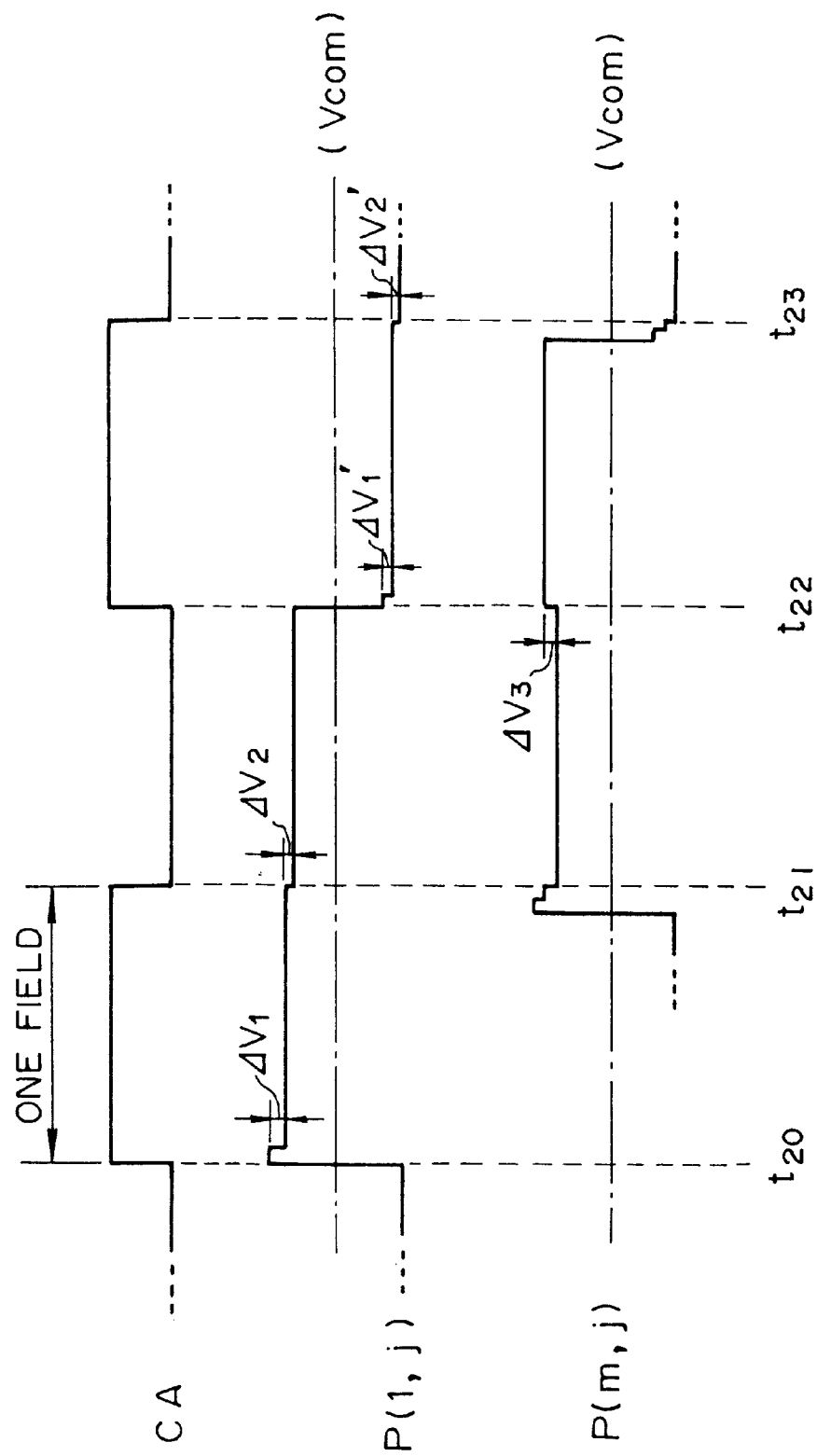
FIG. 4 is an illustration showing the fluctuation in pixel potentials in the first mode of one embodiment.

In the case of the first mode of the above one embodiment, pixel potentials are fluctuated as shown in FIG. 4 (Vcom denotes the potential of a counter electrode) because control signals are changed every display field. This is caused by feed-through voltages ($\Delta V_1$, $\Delta V_1$) supplied from scanning lines immediately after image data is written ($t_{20}$, $t_{22}$) and a feed-through voltage supplied from the control line CA (CB). In this case, the pixel-potential fluctuation ($\Delta V_2$, $\Delta V_2$) due to the feed-through voltage from the control line occurs at the timings ($t_{21}$, $t_{23}$) for setting a control signal to L level. Moreover, at a pixel P(m,j), the pixel-potential fluctuation ($\Delta V_3$) due to a feed-through voltage from a control line occurs at the timing ($t_{22}$) for setting a control signal to H level. This is because the relative timing with image data write depends on the position of a scanning line as shown in FIG. 4 and thereby, an effective voltage differs at the pixels P(1,j) and P(m,j). Therefore, as a result, luminance unevenness may occur for the raster display of the same color.

Therefore, the second mode of one embodiment of the present invention changes generation modes of the control signals CA and CB as shown in FIG. 5. First, when it is assumed that display of a display field is started at the time $t_3$, the control signal on the control line CA is set to H level and that of the control line CB is set to L level, the switching device $T_{CA}$ is turned on and the switching device $T_{CB}$ is turned off, and image data is written in the pixels P(1,j) and P(1,j+3) located at the control line CA side of the first row similar to the above case.

Then, when the gate signal on the scanning line $G_1$ becomes L-level and the gate signal on the scanning line $G_2$ is set to H level at the time $t_4$, the control signal on the control line CA is switched to L level and the control signal on the control line CB is switched to H level. Thereby, in the second row, image data is written in the pixels P(2,j+1) and P(2,j+2) located at the control line CB side with negative polarity.

Hereafter similarly, the control signals on the control lines CA and CB are switched every horizontal scanning period and the pixels P(i,j) and P(i,j+3) located at the control line CA side and the pixels P(i,j+1) and P(i,j+2) located at the control line CB side are alternately selected to write image data.

Moreover, in display fields at time T downward, the control signal on the control line CA is set to L level and that of the control line CB is set to H level to write image data in the pixels P(1,j+1) and P(1,j+2) located at the control line CB of the first row with positive polarity. Hereafter, image data is written while changing control signals similar to the above case so as to write image data in pixels not selected between the times $t_3$ and $t_5$.

Figure 6A:
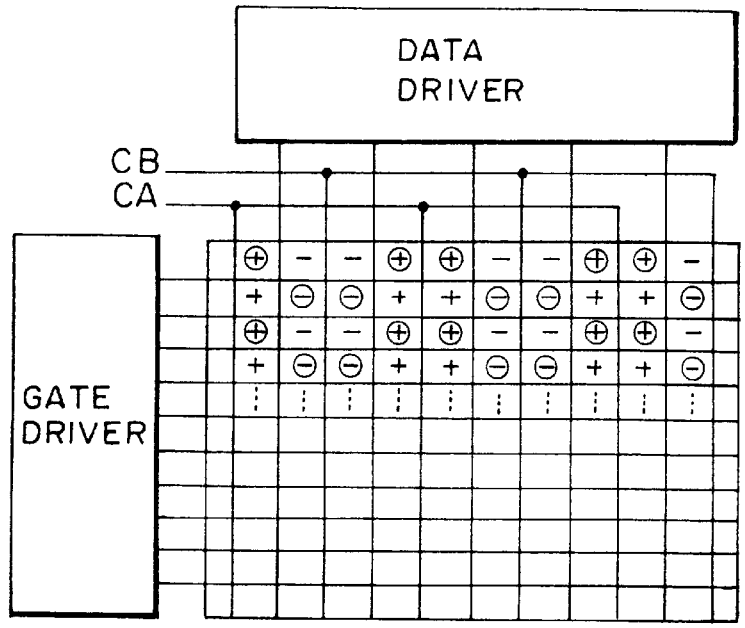
FIGS. 6A and 6B are illustrations schematically showing the pixels in which image data is written in accordance with the second mode of one embodiment.
Figure 6B:
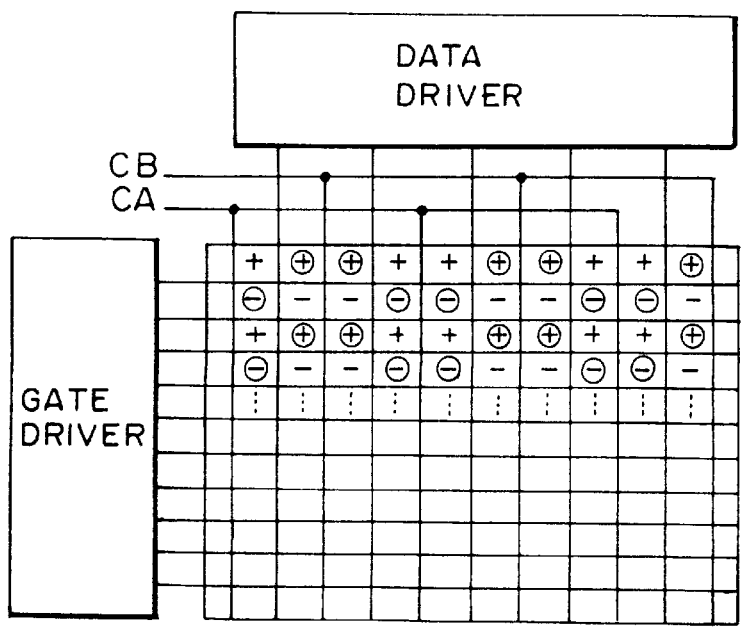

FIGS. 6A and 6B schematically show the pixels in which image data is written in each field in the above manner. FIGS. 6A and 6B also show the pixels in which image data is written by the polarities enclosed by a circle similar to the case of FIGS. 3A and 3B. The polarity distributions shown in FIGS. 6A and 6B are slightly different from those in FIGS. 3A and 3B. In any case, however, the distributions become similar to 1H reversal.

Figure 7:
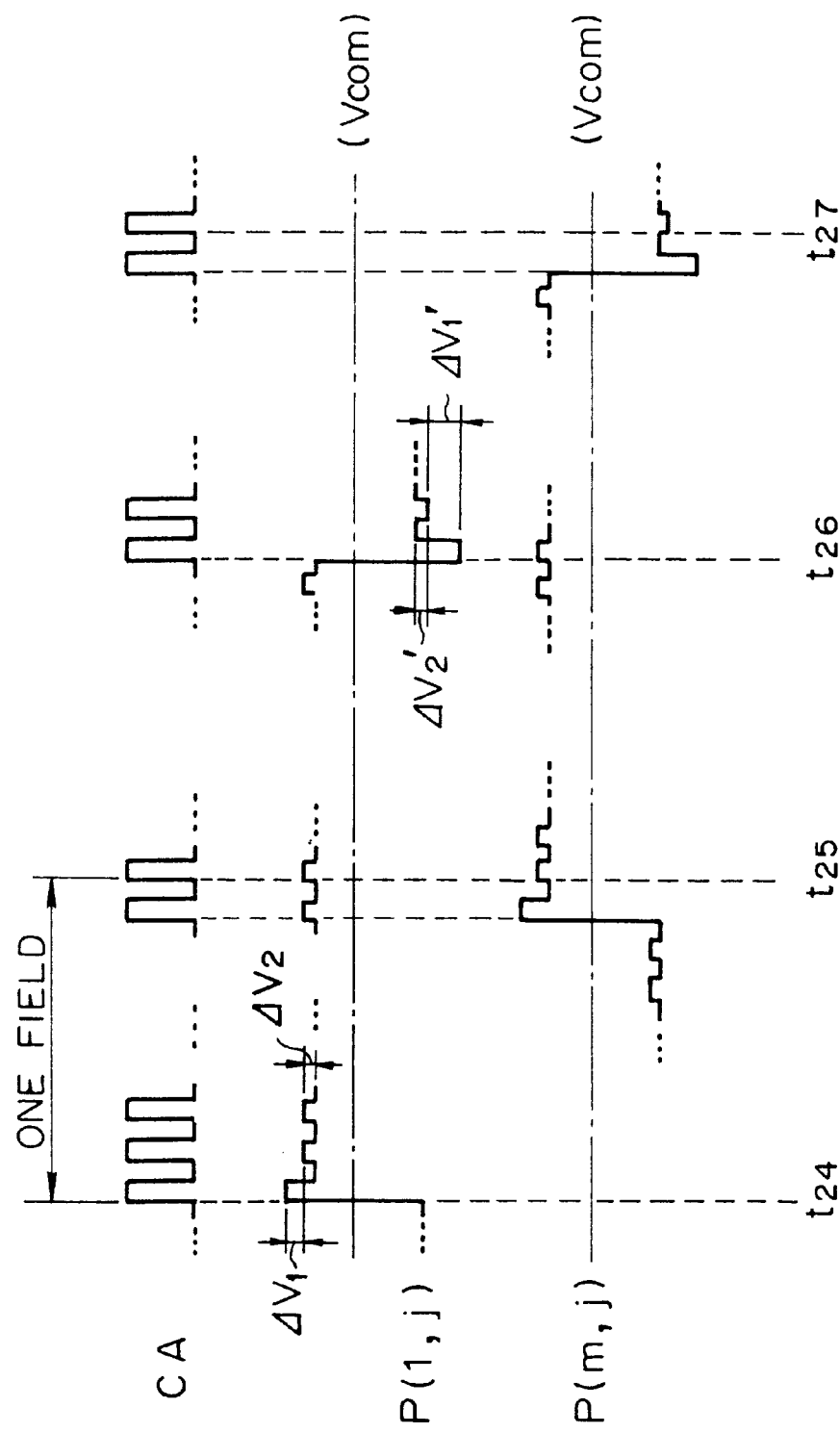
FIG. 7 is an illustration showing the fluctuation in pixel potentials in the second mode of one embodiment.

FIG. 7 shows how pixel potentials fluctuate in the above-described display operation. In the case of the second mode of this embodiment, control signals are changed every scanning period. Therefore, as shown in FIG. 7, there is no relative timing difference between the timing for setting a control signal to L level and the timing for writing image data. Thus, the effective voltage is not different between the pixels P(1,j) and P(m,j) or luminance unevenness does not occur in a raster display of the same color.

Figure 8:
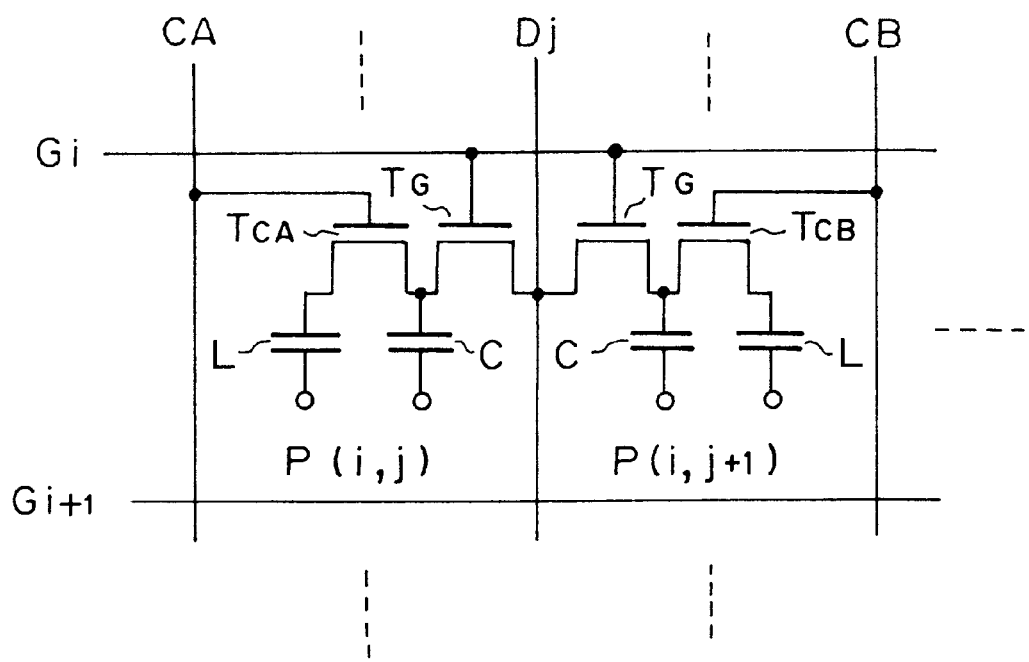
FIG. 8 is an illustration showing the structure for preventing the holding rate from decreasing in the second mode of one embodiment.

However, the above display operation has a problem that the rate for holding the image signal for each pixel is decreased. Therefore, as shown in FIG. 8, a holding capacitance C is set between the switching device $T_G$ on one hand and the switching devices $T_{CA}$ and $T_G$ on the other respectively. Thus, the problem on the decrease of the holding rate can be solved.

In the case of the above second mode of one embodiment, the relative timing difference between the timing for setting a control signal to L level and the timing for writing image data is eliminated independent of the position of a scanning line by changing the control signal every scanning period. However, it may be necessary to drive pixels by using the control signal generation mode of the first mode of one embodiment shown in FIG. 2. In this case, it is impossible to solve the original problem. To eliminate the difference in effective voltage between the pixels P(1,j) and P(m,j) shown in the first embodiment, it is also considered to compensate the difference between voltage values by a proper method.

However, the difference between voltage values cannot be compensated due to the fluctuation in liquid crystal layers L in many cases.

The third mode of one embodiment of the present invention is made to solve the above problems.

Figure 9:
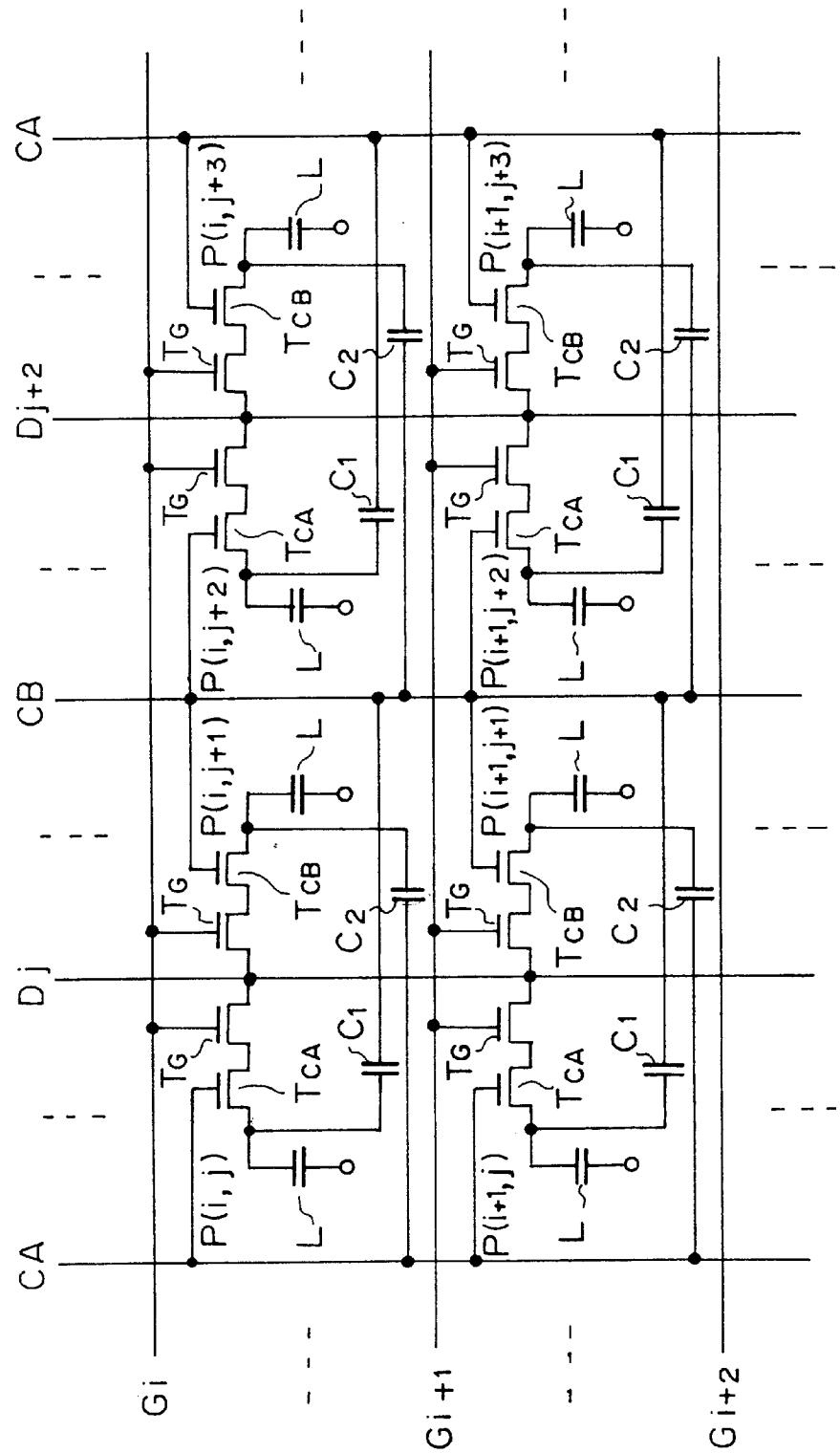
FIG. 9 is an illustration showing the structure of a liquid crystal panel of the liquid crystal display of the third mode of one embodiment.

FIG. 9 is an illustration showing the structure of a liquid crystal panel of the liquid crystal display of the third mode of one embodiment of the present invention. The liquid crystal display of the third mode of one embodiment of the present invention shown in FIG. 9 is different from the liquid crystal display of the first mode of one embodiment of the present invention in that a holding capacitance $C_1$ is set between the other electrode of the switching device $T_{CA}$ and the control line CB and a switching device $C_2$ is set between the other electrode of the switching device $T_{CB}$ and the control line CA. In the case of the above structure, FIGS. 10A and 10B in which each pixel is driven by the control signal generation mode shown in the first mode of one embodiment are the same as the illustration showing the pixel-potential fluctuation shown in FIG. 4 and FIG. 10C is an illustration showing the pixel-potential fluctuation of the third mode of one embodiment of the present invention.

As shown in FIG. 10A, the potential of the pixel P(i,j) is lowered by $\Delta V_1$ at the rise of the control signal CA and lowered by $\Delta V_2$ at the fall of the signal CA as shown in FIG. 10B. This phenomenon is caused by a field-through voltage due to the parasitic capacitance of a TFT constituting the switching device $T_G$.

When it is assumed that the parasitic capacitance between the gate and the drain of a TFT is $C_{gd}$, the capacitance of a pixel L is $C_{1c}$, the voltage amplitude width of the control lines CA and CB is $V_c$, and the values of the above holding capacitances $C_1$ and $C_2$ is $C_x$, the above value $\Delta V_2$ is shown by the following equation (1).

$$\Delta V_2 = (C_{gd} - C_x) / (C_{gd} + C_{1c} + C_x) \times V_c \qquad (1)$$

Therefore, by setting the value $C_x$ of the holding capacitances $C_1$ and $C_2$ as $C_x = C_{gd}$, the numerator of the above equation becomes 0 and thus, the value $\Delta V_2$ can be decreased to 0.

FIG. 10C is an illustration showing the pixel potential when setting the value $C_x$ of the holding capacitances $C_1$ and $C_2$ as $C_x = C_{gd}$. From FIG. 10C, it is found that the pixel potential does not change even at the fall of the control line CA (CB). Therefore, even by using the control signal generation mode shown in the first mode of one embodiment, the power consumption does not increase, the liquid crystal layer L does not seize, and flicker does not occur.

Then, the fourth mode of one embodiment is described below which performs a display operation by changing the generation mode of an image signal on the signal line $D_j$. In the case of this mode, each signal is generated by the generation mode shown in FIG. 11. This corresponds to the case of using the above first mode of one embodiment as a generation mode of a gate signal and a control signal and supplying image signals at different polarities through adjacent signal lines. This embodiment can be used for the liquid crystal display of the first mode of one embodiment of the present invention shown in FIG. 1 and the liquid crystal display of the third mode of one embodiment of the present invention shown in FIG. 9.

Figure 11:
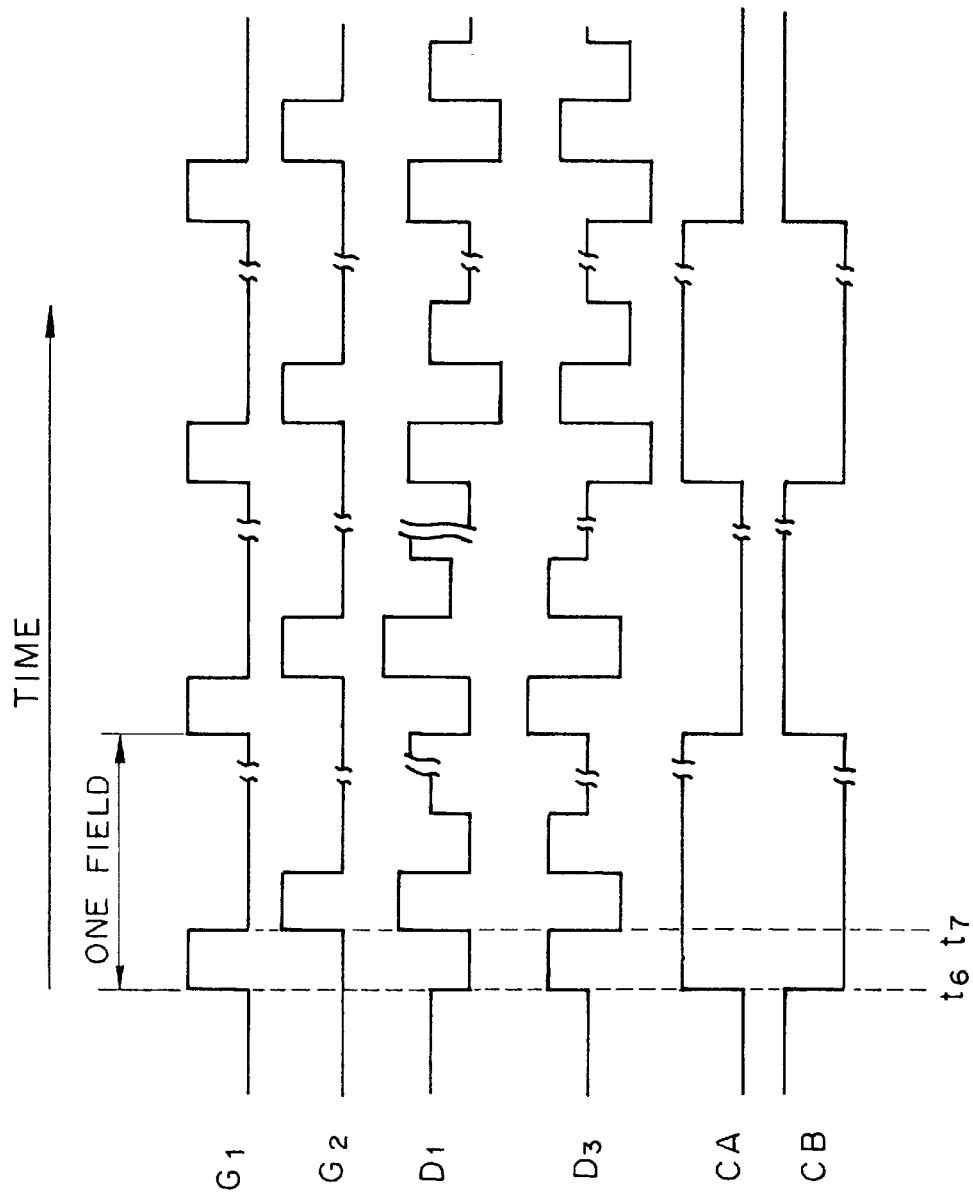
FIG. 11 is an illustration showing the generation mode of each signal in the fourth mode of one embodiment.

First, a control signal on the control line CA is set to H level in one horizontal period between times $t_6$ and $t_7$ to write image data in the pixels P(1,j) and P(1,j+3). Then, the polarity of an image signal supplied in the above case is set to negative polarity for the signal line $D_1$ and to positive polarity for the signal line $D_3$ as shown in FIG. 11. Moreover, though not illustrated, image signals are supplied at different polarities such as −, +, −, +, . . . through adjacent signal lines through signal lines $D_5$, $D_7$, $D_g$, $D_{11}$ . . . .

Then, image data is written in the pixels P(2,j) and P(2,j+3) located at the second-row control line CA side starting with time $t_7$. In this case, the polarity of an image signal is reversed for the first row in each signal line. As described above, the polarity of an image signal is made different for each signal line at the time of data write in each row and also in the next field display operation, and image signals are supplied at different polarities such as −, +, −, +, . . . through the signal lines $D_1$, $D_3$, $D_5$, $D_7$, . . . .

Then, in the next field display operation, the image signal polarity on each signal line in each row uses a polarity obtained by reversing each of the above polarities. That is, image signals are supplied at the polarities of +, −, +, −, . . . through the signal lines $D_1$, $D_3$, $D_5$, $D_7$, . . . . Hereafter, the change of these polarities is similarly repeated to perform reversal driving.

Figure 12A:
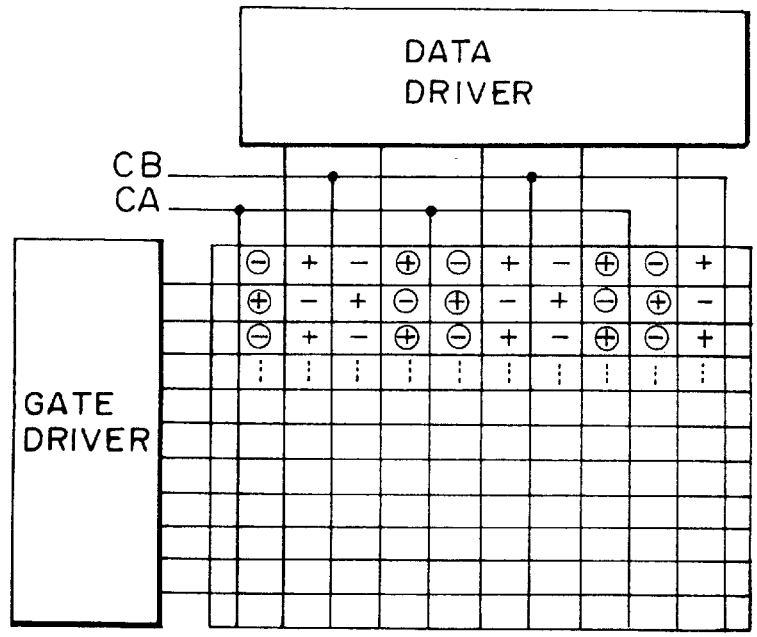
FIGS. 12A and 12B are illustrations schematically showing the pixels in which image data is written in accordance with the fourth mode of one embodiment.
Figure 12B:
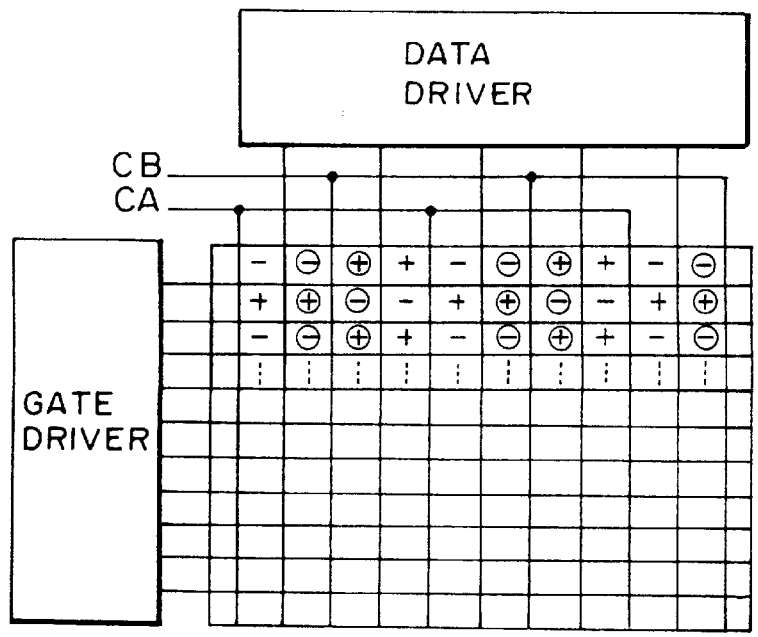

FIGS. 12A and 12B schematically show the pixels in which image data is written for each field by the above-described display operation. FIGS. 12A and 12B also show a pixel in which image data is written by the same expression style as the cases of FIGS. 3 and 6. The polarity distribution shown in FIG. 12 is closer to dot reversal compared to the polarity distributions shown in FIGS. 3 and 6. Therefore, according to the display operation of this mode, flicker becomes less noticeable and stroke also decreases compared to the case of the display operations of the first and second modes of the first embodiment.

In the case of common reversal driving, the polarities of image signals at the same timing must be the same. Therefore, counter electrode potentials are fluctuated due to the capacitive coupling between a signal line and the counter electrode. This causes contrast to deteriorate and stroke to increase. Therefore, the fifth mode of one embodiment superimposes a cancel signal for canceling the fluctuation in counter electrode potentials on a control signal.

Figure 13:
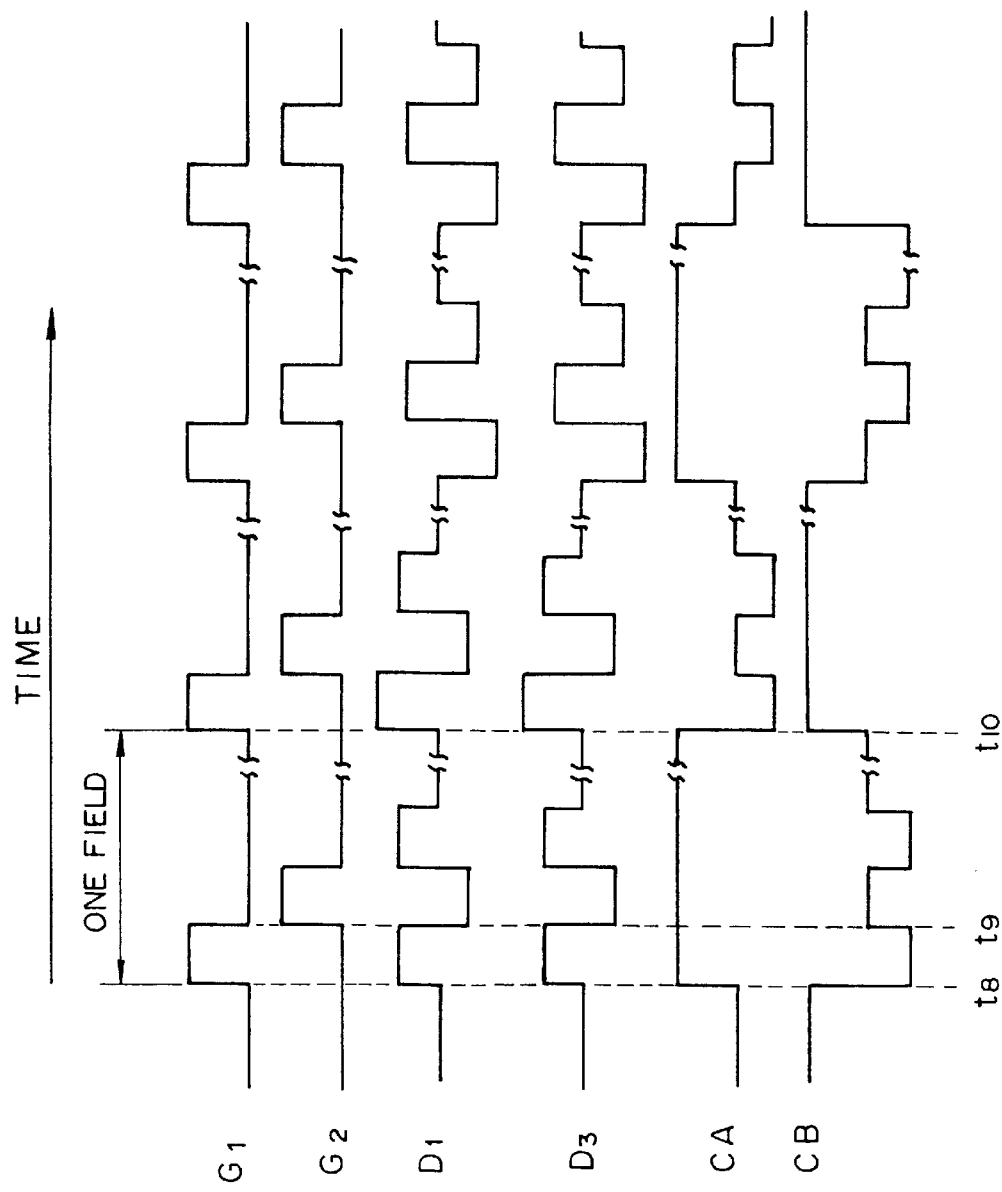
FIG. 13 is an illustration showing the generation mode of each signal in the fifth mode of one embodiment.

FIG. 13 shows the generation mode of each signal in the case of this mode, in which a cancel signal is superimposed on a control signal in the case of the first mode of one embodiment.

This mode can be used for the liquid crystal display of the first mode of one embodiment of the present invention shown in FIG. 1 and the liquid crystal display of the third mode of one embodiment of the present invention shown in FIG. 9.

First, when it is assumed that display of a display field starts at a time $t_8$, a control signal on the control line CA is set to H level to write image data in the pixels P(1,j) and P(1,j+3) located at the control line CA side of the first row with positive polarities (D$_1$, D$_3$, . . .).

In this case, a cancel signal for canceling the fluctuation in counter electrode potentials due to a positive-polarity image signal is superimposed on a control signal on the control line CB to be set to L level. That is, as shown by the control signal (CB) at times t$_8$ and t$_9$ in FIG. 13, the control signal on the control line CB is generated by superposing a constant negative-polarity voltage on a normal L-level signal. Thereby, the sum of the control signals on the control lines CA and CB is made to have a polarity opposite to the polarity of an image signal. The above negative-polarity voltage denotes a voltage having negative polarity on the basis of the potential of a counter electrode. Moreover, an amplitude for generating a reverse polarity to an image signal is properly set (e.g. approx. 4 to 10 V).

Furthermore, to write image data in the pixels P(2,j) and P(2,j+3) of the second row with negative polarity starting with the time t$_9$, a control signal on the control line CB is generated by superimposing a constant positive-polarity voltage on a normal L-level signal. In this case, the positive-polarity voltage denotes a voltage based on a counter electrode potential. Hereafter similarly, a voltage at a polarity opposite to the polarity of an image signal is superimposed on a control signal on the control line CB.

Then, to display the next display field starting with a time t$_{10}$, a control signal on the control line CB is set to H level to write image data in the pixels P(i,j+1) and P(i,j+2). Moreover, in this case, a cancel signal same as the above is superimposed on a control signal on the control line CA to be set to L level.

As described above, by superimposing a cancel signal for preventing counter electrode potentials from fluctuating on a control signal, it is possible to prevent contrast from deteriorating and stroke from increasing. In this case, the cancel signal must be a signal which makes the sum of control signals on the control lines CA and CB have a polarity opposite to the polarity of an image signal. Therefore, superposition of a cancel signal is not restricted to the above constitution. It is possible to superimpose a cancel signal on a control signal to be set to H level or on either control signal.

According to the fifth mode of one embodiment, the fluctuation in counter electrode potentials are prevented by a cancel signal. In the case of the fifth mode of one embodiment, however, it is impossible to completely remove the fluctuation in counter electrode potentials due to the influence of an image signal level because a cancel signal is made to have a constant positive-polarity voltage or a constant negative-polarity voltage. Therefore, in the case of this mode, means for specifically determining a proper cancel signal and superimposing the cancel signal on a control signal is described.

Figure 14:
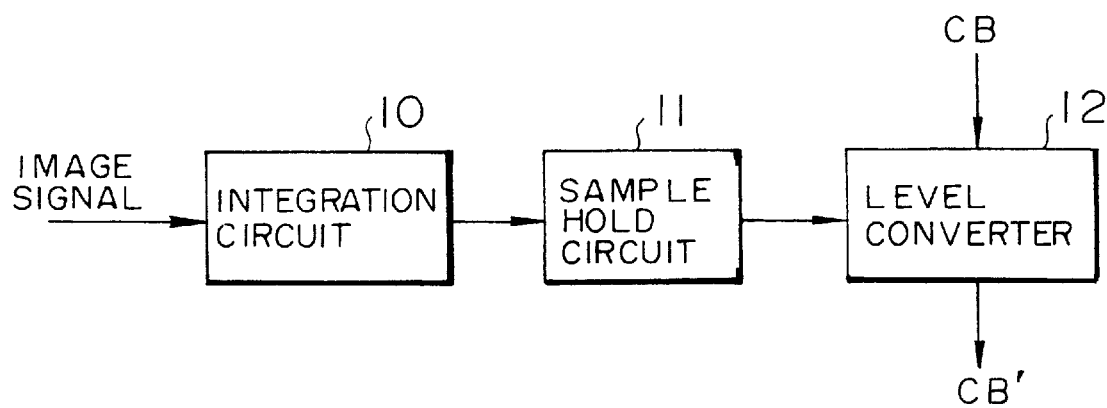
FIG. 14 is a block diagram showing the structure of means for computing and superimposing a cancel signal in the sixth mode of one embodiment.

FIG. 14 is a block diagram showing the structure of the above cancel-signal calculation and superposition means. In FIG. 14, symbol 10 denotes an integration circuit for integrating image signals included in one horizontal scanning period and successively outputting integrated values to a sample hold circuit 11. The sample hold circuit 11 samples and holds the integrated values successively output for one horizontal scanning period and continuously outputs them to a level conversion circuit 12. The level conversion circuit 12 converts the levels of control signals on the control line CB (or CA) in accordance with the integrated values receiving from the sample hold circuit 11.

In this case, level conversion by the level conversion circuit 12 is selected so that the fluctuation in counter electrode potentials can be properly removed in accordance with the numbers and the sizes (widths) of signal lines D$_j$ and control lines CA and CB. For example, as shown in FIG. 1, when the number of signal lines D$_j$ equals the sum of the numbers of control lines CA and CB and the widths of the signal lines and control lines are equal, level conversion is performed in which the average value of image signals is computed from the integrated values and a voltage two time larger than the average value and having a polarity opposite to the polarity of the image signals is superimposed on a control signal. In this case, the magnitude of a cancel signal is made two times larger than the average value because the number of control lines on which the cancel signal is superimposed comes to ½ the number of signal lines.

Figure 15:
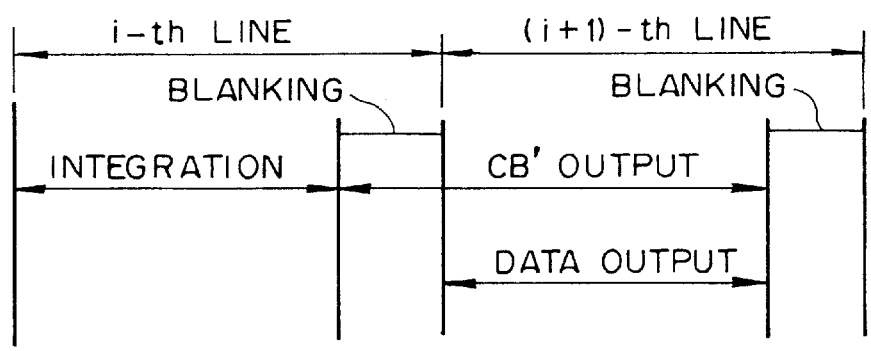
FIG. 15 is an illustration explaining operations of cancel-signal computing and superposing means.

In the case of the above structure, as shown in FIG. 15, while display of an i-th row is performed, image signals on the next (i+1)-th row are integrated by an integration circuit 10 (period of "integration" in FIG. 15). In this case, because the image signals are supplied in the effective display period of one horizontal scanning period, the integrating operation is completed before one horizontal scanning period is completed as shown in FIG. 15. Moreover, when the integrating operation is completed, the then obtained integrated value is output to the sample hold circuit 11 and outputting of the value to the level conversion circuit 12 is started.

Thereby, the level conversion circuit 12 level-converts a control signal in accordance with the integrated value and starts outputting the level-converted control signal after the effective display period of the i-th row is completed ("CB' output" in FIG. 15). Then, the display of th e(i+1)-th row is started ("data output" in FIG. 15).

As described above, according to this mode, a cancel signal is computed at any time by considering the level of an image signal. Therefore, the influence of the level of an image signal can be eliminated and the fluctuation in counter electrode potentials can be completely removed.

Another Embodiment

Figure 19:
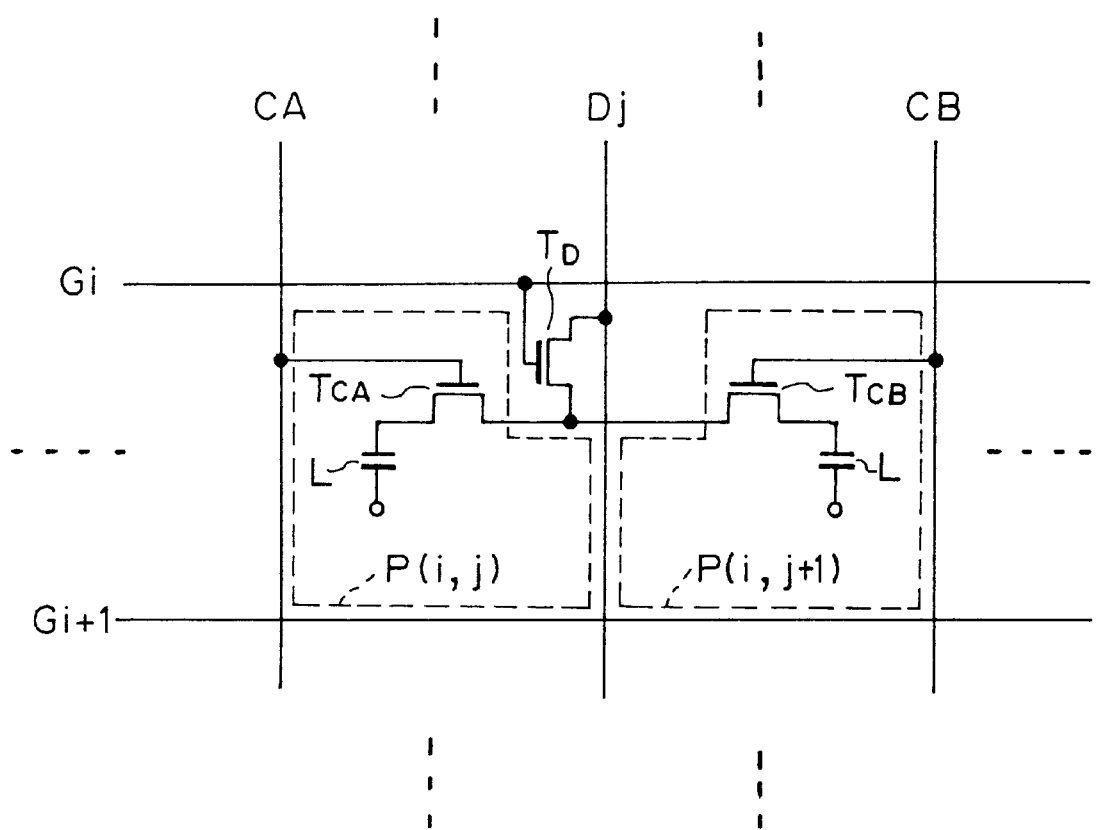
FIG. 19 is an illustration showing the structure of a liquid crystal panel of the liquid crystal display of another embodiment of the present invention.

Another embodiment of the present invention is described below by referring to the accompanying drawings. FIG. 19 is an illustration showing the structure of a liquid crystal panel of the liquid crystal display of another embodiment of the present invention. FIG. 19 shows the constitution of pixels at a part of the liquid crystal panel in which n pixels having the illustrated structure are horizontally arranged and m pixels having the structure are vertically arranged like a matrix to constitute the liquid crystal panel. Moreover, a gate driver for driving scanning lines and a data driver for driving signal lines are provided for the margin of the liquid crystal panel (see FIG. 21).

In FIG. 19, symbol Gi (i=1,2, . . , and m) denotes a horizontally-arranged scanning line which transmits a gate signal output from the gate driver at a predetermined timing to successively drive the pixels of each row. Symbol Dj (j=1,3, . . . , and n-1) denotes a vertically-arranged signal line which transmits an image signal output from the data driver at a predetermined timing to supply an image signal to the pixels of each column.

Symbols CA and CB are control lines arranged at both sides of each signal line Dj parallel with the signal lines Dj. These control lines CA and CB are alternately arranged as shown in FIG. 19 and either control line is arranged between signal lines. Moreover, the control lines CA are connected to each other in common and the control lines CB are also connected to each other in common (see FIG. 21 ) so as to respectively transmit a control signal at a predetermined timing to be mentioned later.

P(i,j) in FIG. 19 denotes a pixel at i-th row and j-th column. Each pixel is provided correspondingly to the intersection between each scanning line, signal line, and control line. That is, in each row, two pixels are arranged on one signal line, and either of the two pixels is located at the control line CA side and the other is located at the control line CB side. For example, at the intersection between the scanning line Gi and the signal line Dj, the pixel P(i,j) is located at the control line CA side at the left of the signal line Dj and the pixel P(i,j+1) is located at the control line CB side at the right of the signal line Dj.

Each pixel has a liquid crystal layer L. The liquid crystal layer L provided between the signal line Dj and the control line CA in FIG. 19 is connected with the drain electrode of the switching device $T_{CA}$ such as a TFT and the liquid crystal layer L provided between the signal line Dj and the control line CB is connected with the drain electrode of the switching device $T_{CB}$. Moreover, the source electrode of the switching device $T_{CA}$ is electrically connected with that of the switching device $T_{CB}$. The gate electrode of the switching device $T_{CA}$ is connected to the control line CA and that of the switching device $T_{CB}$ is connected to the control line CB.

Furthermore, the signal line Dj is provided with a switching device $T_D$ every pixels P(i,j) and P(i,j+1) provided on the right and left of the signal line Dj. The gate electrode of the switching device $T_D$ is connected to the scanning line Gi, the source electrode is connected to the signal line Dj, and the drain electrode is connected to the source electrodes of the switching devices $T_{CA}$ and $T_{CB}$.

The switching device $T_D$ is switched on/off by a gate signal and the switching devices $T_{CA}$ and $T_{CB}$ are switched on/off by a control signal transmitted through the control lines CA and CB.

According to the above structure, an image signal transmitted through a signal line is applied to each liquid crystal layer L in accordance with the logical product between on/off of the switching device $T_D$ and on/off of the switching device $T_{CA}$ or $T_{CB}$ and image data is written.

Figure 20:
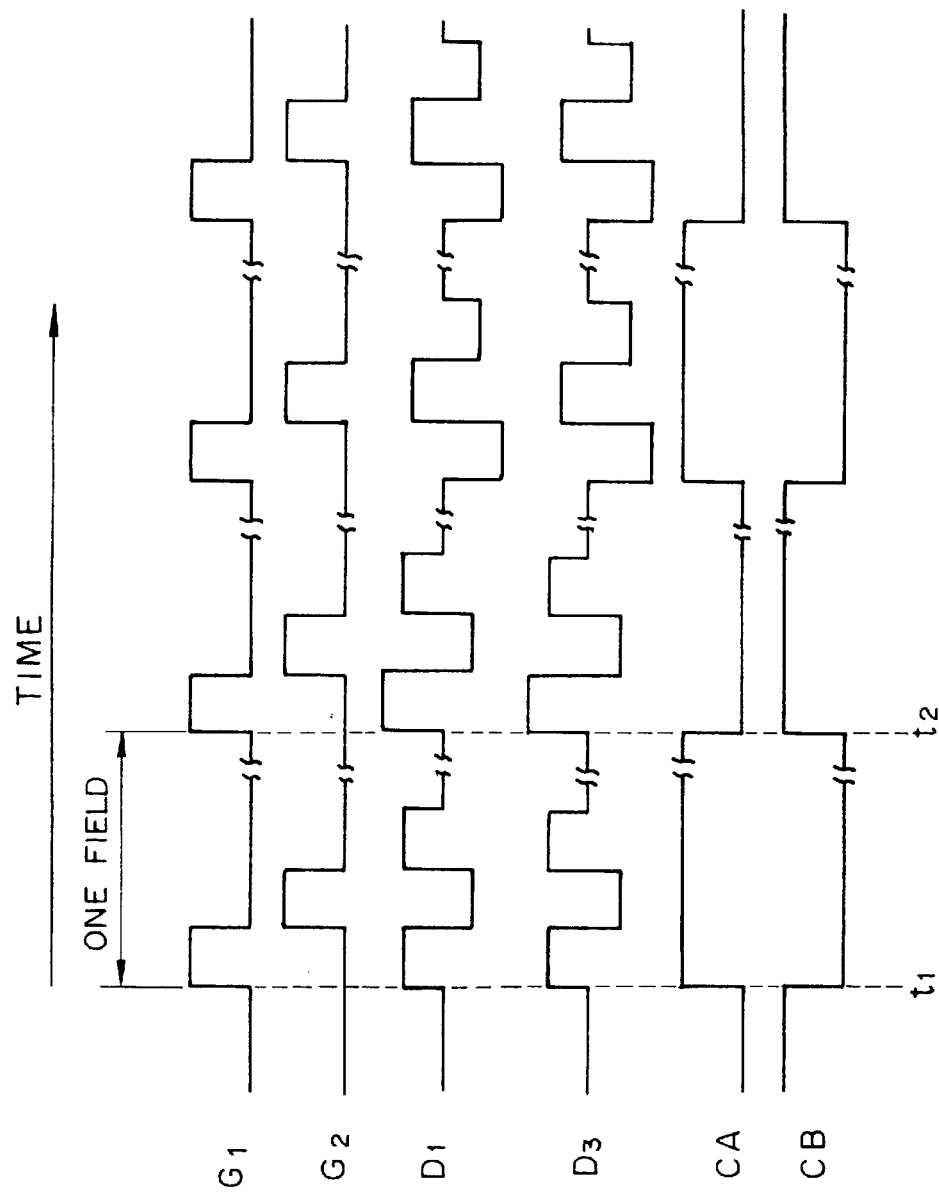
FIG. 20 is an illustration showing the generation mode of each signal in the first mode of another embodiment.

Then, the image display operation by the above structure is described below. FIG. 20 shows a first example of the generation mode of each signal in the case of this embodiment. In FIG. 20, symbols $G_1$ and $G_2$ denote gate signals transmitted through scanning lines $G_1$ and $G_2$, $D_1$ and $D_3$ denote image signals transmitted through signal lines $D_1$ and $D_3$, and CA and CB denote control signals transmitted through signal lines $D_1$ and $D_3$. These scanning lines $G_1$ and $G_2$ and signal lines $D_1$ and $D_3$ correspond to the case of viewing FIG. 19 as i=j=1 (the signal line $D_3$ is omitted in FIG. 19).

First, when display of a display field (image display unit) is started at the time $t_1$, a control signal on the control line CA is set to H level, a control signal on the control line CB is set to L level, the switching device $T_{CA}$ is turned on, and the switching device $T_{CB}$ is turned off. Moreover, at the same time, a gate signal on the scanning line $G_1$ is set to H level and the H level is held for one horizontal scanning period. Thereby, the switching devices $T_D$ and $T_{CA}$ are both turned on only at the pixels (P(1,1), P(1,4), . . . , P(1,j), P(1,j+3), . . . ) located at the first-row control line CA side for one horizontal scanning period and image data supplied from signal lines is written in these pixels.

In this case, image data is supplied by an image signal corresponding to the image data. In the case of this mode, however, an image signal is supplied at a polarity which is kept in the same state for one horizontal scanning period but reversed every horizontal scanning period. Moreover, the same is true for image signals supplied through not-illustrated other signal lines $D_5$, $D_7$, . . . Thereby, the image data of the first row during the display operation is supplied by a positive-polarity image signal as illustrated and written in the pixels at first-row and j-th column and first row and (j+3)-th column with positive polarity.

Then, when one horizontal scanning period passes and a gate signal on the scanning line $G_1$ becomes L-level, a gate signal on the scanning line $G_2$ is set to H level. Moreover, the control signals on the control lines CA and CB hold the above state and still keep the switching device $T_{CA}$ switched on and the switching device $T_{CB}$ switched off. Thereby, the switching devices $T_D$ and $T_{CA}$ are both switched on only at the pixels (P(2,1), P(2,4), . . . , P(2,j), P(2,j+3), . . . ) located at the second-row control line CA side and image data is written in these pixels. In this case, because the polarity of an image signal is reversed as described above, the image data of the second row is written with negative polarity which is opposite to the polarity of the first row.

Figure 21A:
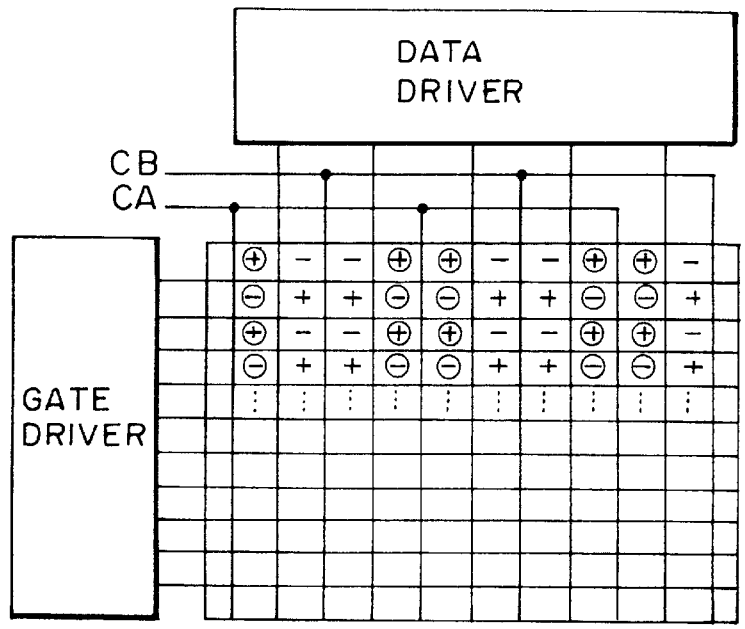
FIGS. 21A and 21B are illustrations schematically showing the pixels in which image data is written in accordance with the first mode of another embodiment.

Hereafter similarly, the scanning lines $G_3$, $G_4$, . . . are successively set to H level (not illustrated) while a control signal on the control line CA is set to H level and a control signal on the control line CB is set to L level and image data is written in the pixels of each row. Thereby, image data is written in the pixels P(i,j) and P(i,j+3) (i=1,2, . . . , and m: j=1,5, . . . , and n-3) for the period equivalent to one field between the times $t_1$ and $t_2$. FIG. 21A schematically shows the pixels in which image data is written in the above manner by the polarities of image signals provided with a circular mark. The polarities not enclosed by a circle in FIG. 21A show the pixels in which image data is already written in the field before the time $t_1$.

Then, at the time $t_2$ in FIG. 20, display of the next display field is started, a control signal on the control line CA is set to L level and a control signal on the control line CB is set to H level, and the switching device $T_{CA}$ is switched off and the switching device $T_{CB}$ is switched on. That is, the pixels (i,j+1) and P(i,j+2) are made ready for image data write instead of the pixels P(i,j) and P(i,j+3) in which image data is written in the period between the times $t_1$ and $t_2$. Then, similar to the above, a gate signal on the scanning line $G_1$ is first set to H level and the switching devices $T_D$ and $T_{CB}$ are turned on only at the pixels (P(1,2), P(1,3), . . . , P(1,j+1), P(1,j+2), . . . ) located at the first-row control line CB side to write image data in these positive-polarity pixels.

Figure 21B:
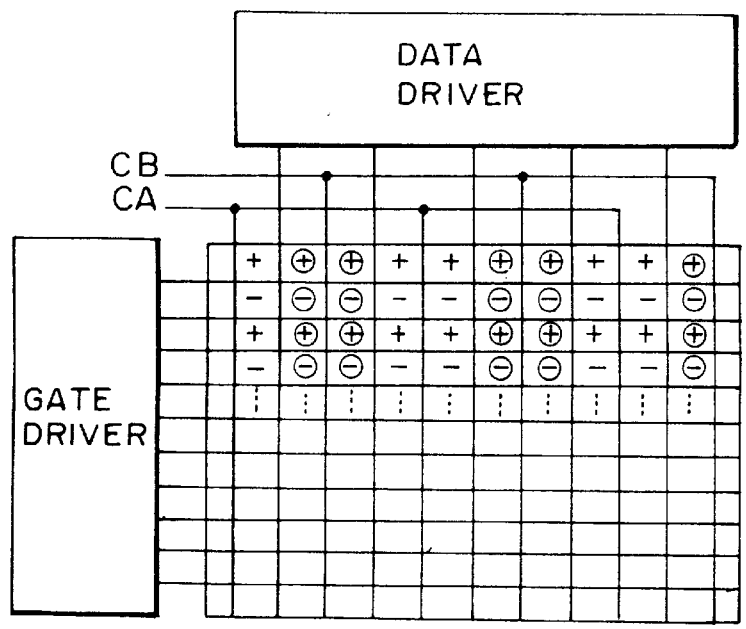

Then, when a gate signal on the scanning line $G_1$ becomes L-level, a gate signal on the scanning line $G_2$ is set to H level. Also in this case, similar to the above, the state of a control signal is kept to write image data in the pixels (P(2,2), P(2,3), . . . , P(2,j+1), P(2,j+2), . . . ) located at the second-row control line CB side at the negative polarity. Also hereafter, similar to the above, the scanning lines $G_3$, $G_4$, . . . are successively set to H level (not illustrated) to write image data in the pixels P(i,j+1) and P(i,j+2) (i=1,2, . . . , and m: j=1,5, . . . , and n-3). FIG. 21B schematically shows the pixels in which image data is written in the above manner. FIG. 21B also shows the pixels in which image data is written by the image-signal polarities enclosed by a circle. Moreover, the polarities not enclosed by a circle in FIG. 21B show the pixels in which image data is written in a field before the time $t_2$, that is, the above field between the times $t_1$ and $t_2$. These pixels correspond to the pixels shown by the image-signal polarities enclosed by a circle in FIG. 21A. As shown in these drawings, the polarity reversal in this mode is similar to 1H reversal in which polarity is reversed every horizontal scanning period.

Hereafter, the above display operation is repeated and the pixels P(i,j) and P(i,j+3) or the pixels P(i,j+1) and P(i,j+2) are selected for each field to write image data. According to the above display operation, image data is written in each pixel once for two fields and the pixel is driven by the polarity reversal which occurs once for two fields. Therefore, a distribution of polarities not enclosed by a circle in FIG. 21A is produced.

Figure 22:
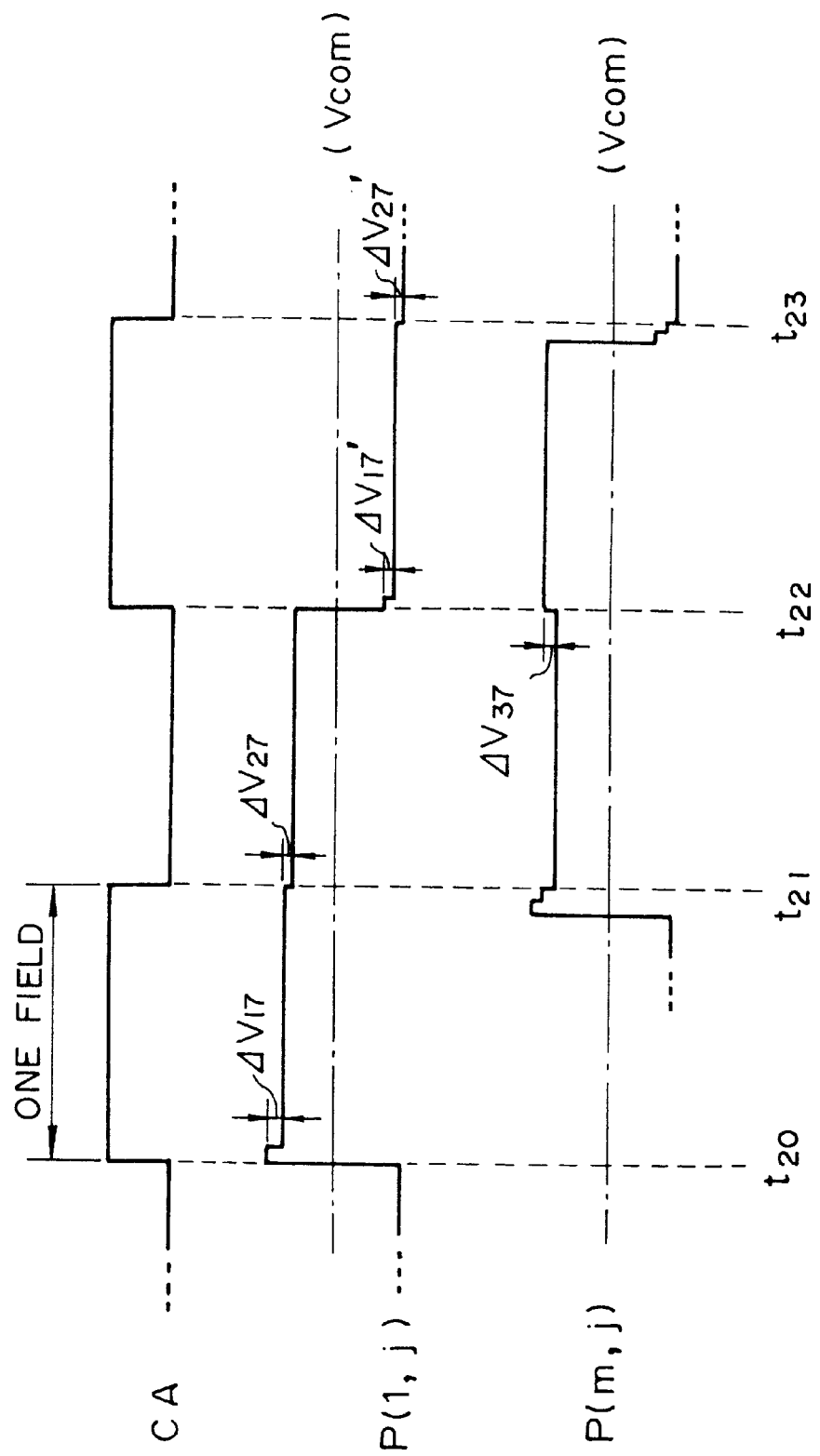
FIG. 22 is an illustration showing the fluctuation in pixel potentials in the first mode of another embodiment.

In the case of the above first mode of another embodiment, control signal are changed every display field. Therefore, the pixel potential is fluctuated as s shown in FIG. 22 (Vcom denotes a counter electrode potential). This is caused by feed-through voltages ($\Delta V_{17}$, $\Delta V_{17}$) supplied from a scanning line immediately after image data is written ($t_{20}$, $t_{22}$) and a feed-through voltage supplied from the control line CA (CB). In this case, the pixel-potential fluctuation ($\Delta V_{27}$, $\Delta V_{27}$) due to the feed-through voltage supplied from the control line is generated at the timing ($t_{21}$, $t_{23}$) for setting the control signal to L level. Moreover, at the pixel P(m,j), the pixel-potential fluctuation ($\Delta V_{37}$) due to the feed-through voltage supplied from the control line is generated at the timing ($t_{22}$) for setting the control signal to H level. As shown in FIG. 22, this is because the relative timing with image data write depends on the position of a scanning line and thereby, the effective voltage at the pixel P(1,j) is different from that at the pixel P(m,j). As a result, luminance unevenness may occur in the raster display of the same color.

Figure 23:
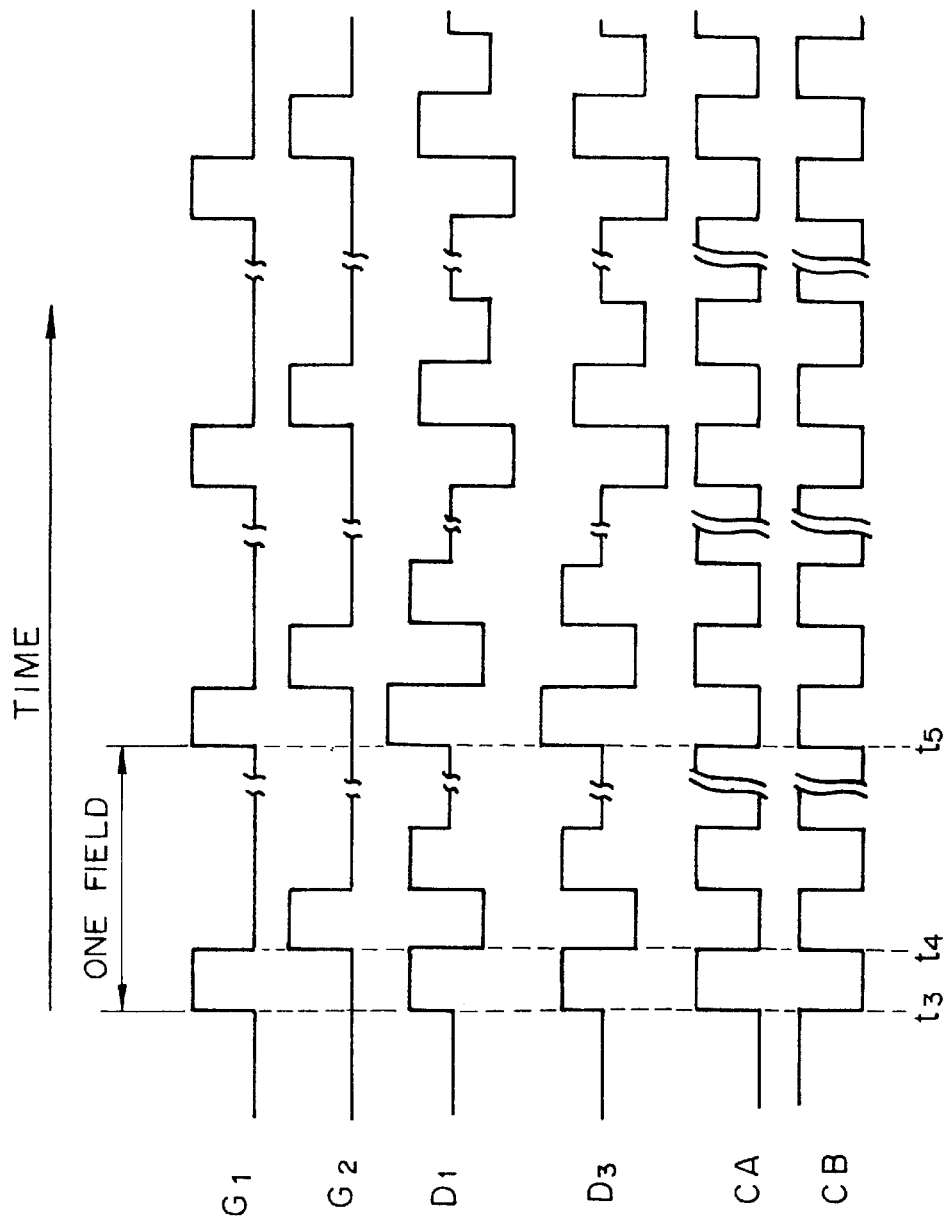
FIG. 23 is an illustration showing the generation mode of each signal in the second mode of another embodiment.

Therefore, in the case of the second mode of another embodiment of the present invention described below, the generation mode of control signals on the control lines CA and CB is changed as shown in FIG. 23. First, when display of a display field is started at the time $t_3$, a control signal on the control line CA is set to H level and a control signal on the control line CB is set to L level, and the switching device $T_{CB}$ is turned on and the switching device $T_{CB}$ is turned off to write image data in the pixels P(1,j) and P(1,j+3) located at the first-row control line CA side with positive polarity similar to the case of the first mode of another embodiment.

Then, when a gate signal on the scanning line $G_1$ becomes L-level at the time $t_4$ and a gate signal on the scanning line $G_2$ is set to H level, the control signal on the control line CA is changed to L level and the control signa on the control line CB is changed to H level. Thereby, in the second row, image data is written in the pixels P(2,j+1) and P(2,j+2) located on the control line CB side with negative polarity.

Hereafter similarly, control signals on the control lines CA and CB are changed every horizontal scanning period and the pixels P(i,j) and P(i,j+3) located at the control line CA side and the pixels P(i,j+1) and P(i,j+2) located at the control line CB side are alternately selected to write image data.

Moreover, in the next display field at the time $t_5$ downward, a control signal on the control line CA is set to L level and a control signal on the control line CB is set to H level at the time $t_5$ to write image data in the pixels P(1,j+1) and P(1,j+2) located at the first-row control line CB side with positive polarity. Thereafter, image data is written while changing control signals similar to the above mentioned and image data is written in pixels not selected at the times $t_3$ to $t_5$.

Figure 24A:
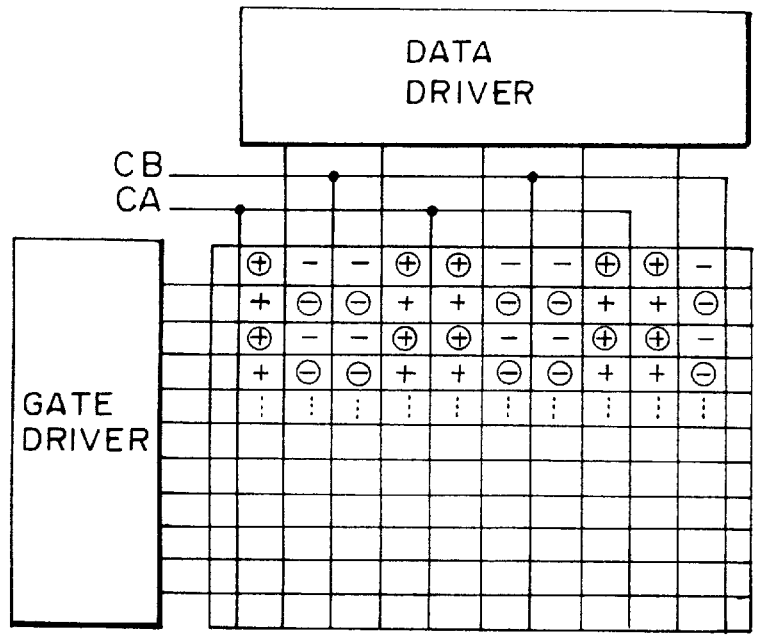
FIGS. 24A and 24B are illustrations schematically showing the pixels in which image data is written in accordance with the second mode of another embodiment.
Figure 24B:
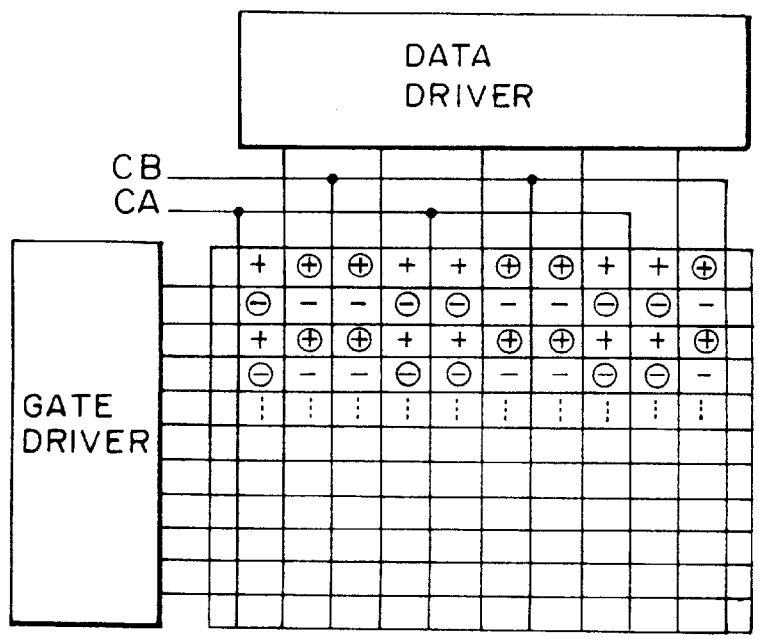

FIGS. 24A and 24B schematically show the pixels in which image data is written in each field. FIGS. 24A and 24B also show the pixels in which image data is written with polarities enclosed by a circle similar to the case of FIGS. 21A and 21B. The polarity distributions shown in FIGS. 24A and 24B are slightly different from those shown in FIGS. 21A and 21B. In any case, however, the distributions are similarly to 1H reversal.

Figure 25:
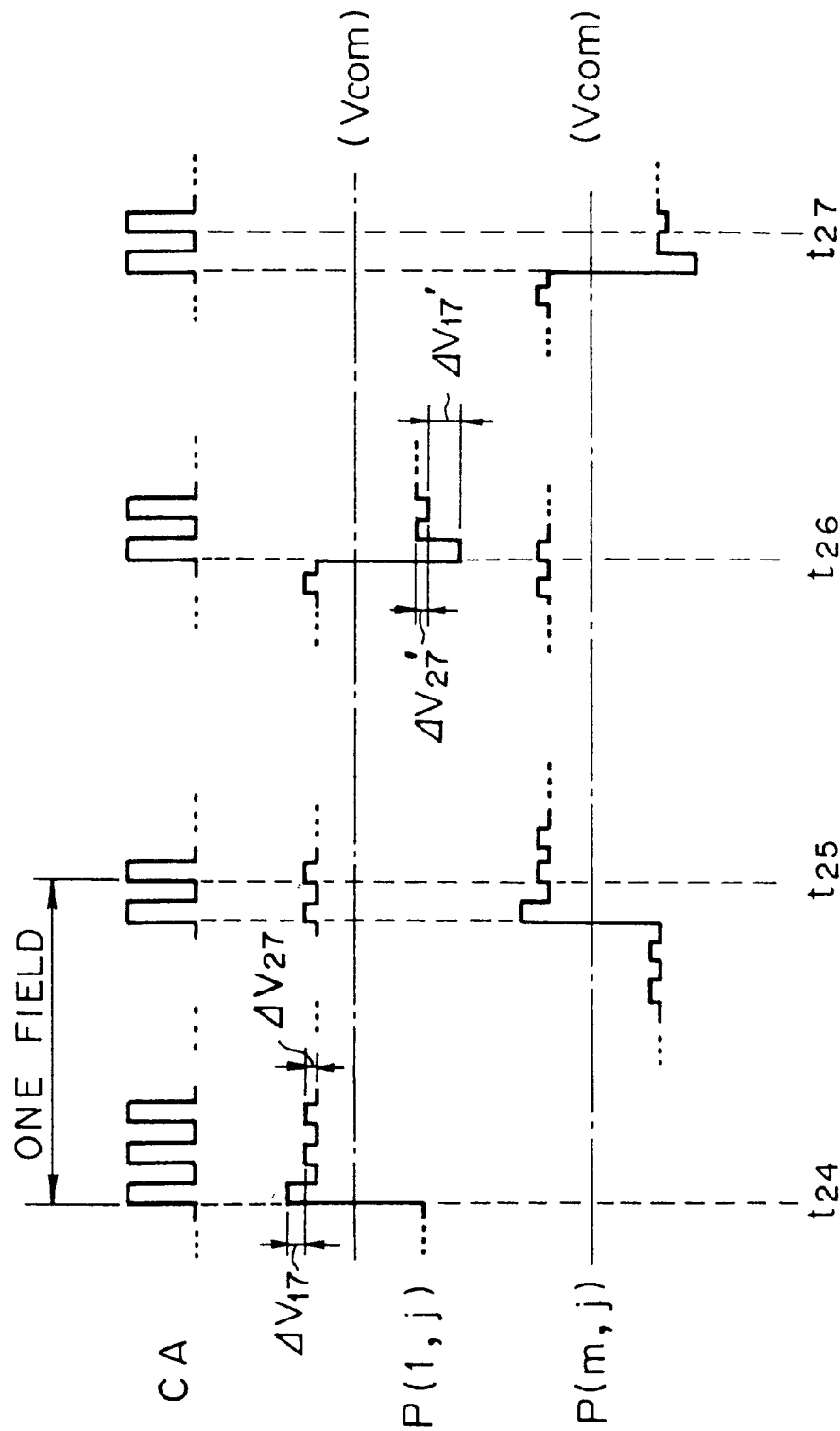
FIG. 25 is an illustration showing the fluctuation in pixel potentials in the second mode of another embodiment.

FIG. 25 shows the pixel-potential fluctuation in the above-described display operation. In the case of this mode, control signals are changed every scanning-line period. Therefore, as shown in FIG. 25, there is no relative timing difference between the timing for setting a control signal to L level and the timing for writing image data independently of the position of a scanning line. Therefore, the effective voltage at the pixel P(1,j) is not different from that at the pixel P(m,j) or luminance unevenness does not occur in a raster display of the same color.

Figure 26:
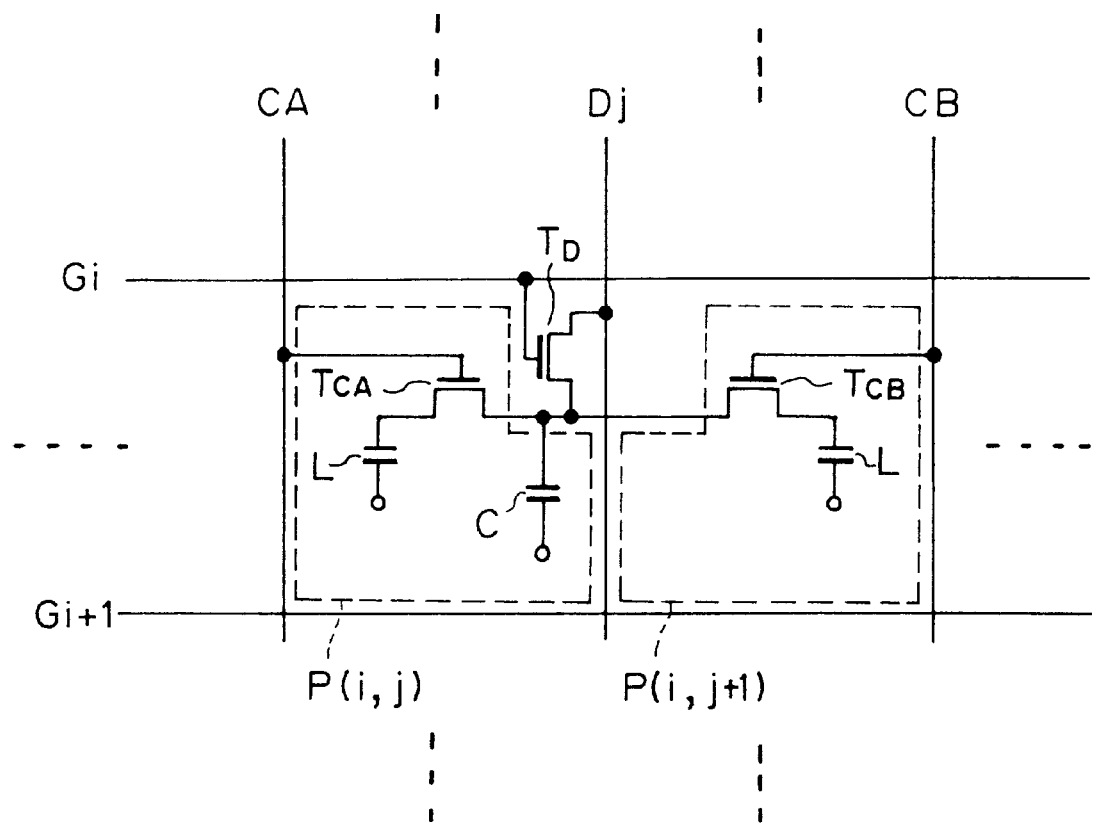
FIG. 26 is an illustration showing a structure for preventing a holding rate from decreasing in the second mode of another embodiment.

However, the above display operation has a problem that the pixel signal holding rate for each pixel is decreased. Therefore, as shown in FIG. 26, a holding capacitance C is set between the switching devices $T_{CA}$ and $T_{CB}$. Thus, the problem of the holding rate can be solved.

In the case of the second mode of another embodiment above described, the relative timing difference between the timing for setting a control signal to L level and the timing for writing image data is eliminated independently of the position of a scanning line. However, it may be necessary to drive pixels by using the control signal generation mode of the first mode of another embodiment shown in FIG. 20. In this case, the original problem cannot be solved. To eliminate the difference of effective voltage between the pixels P(1,j) and P(m,j) shown in the first mode of another embodiment, compensating the difference between voltage values by a proper method is also considered.

However, when compensating the voltage value difference, there are many cases in which the voltage value difference cannot be compensated due to fluctuation in liquid crystal layers L.

The third mode of another embodiment of the present invention is made to solve the above problems.

Figure 27:
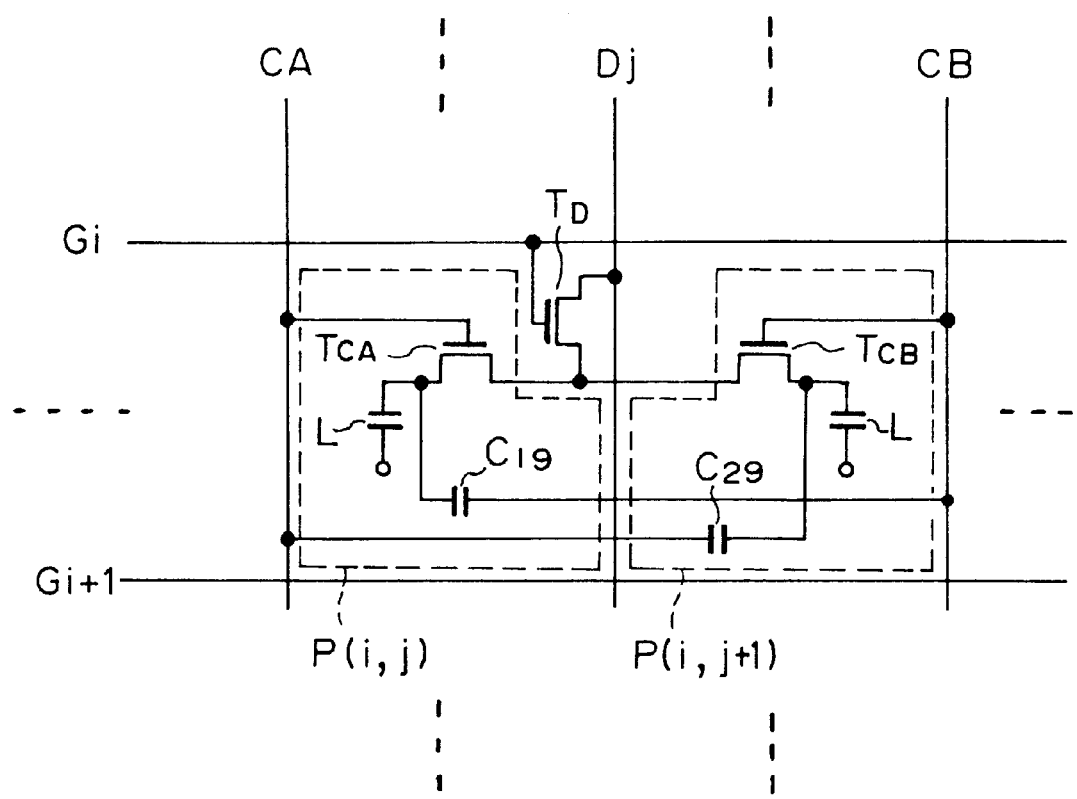
FIG. 27 is an illustration showing the structure of a liquid crystal panel of the liquid crystal display of the third mode of another embodiment.

The liquid crystal display of the third mode of another embodiment of the present invention shown in FIG. 27 is different from the liquid crystal display of the first mode of another embodiment of the present invention shown in FIG. 19 in that a holding capacitance C 19 is set between the other electrode of the switching device $T_{CA}$ and the control line CB and a holding capacitance C 29 is set between the other electrode of the switching device $T_{CB}$ and the control line CA. In the case of this structure, each pixel is driven by the control signal generation mode shown in the first mode of another embodiment.

Figures 28A, 28B, 28C:
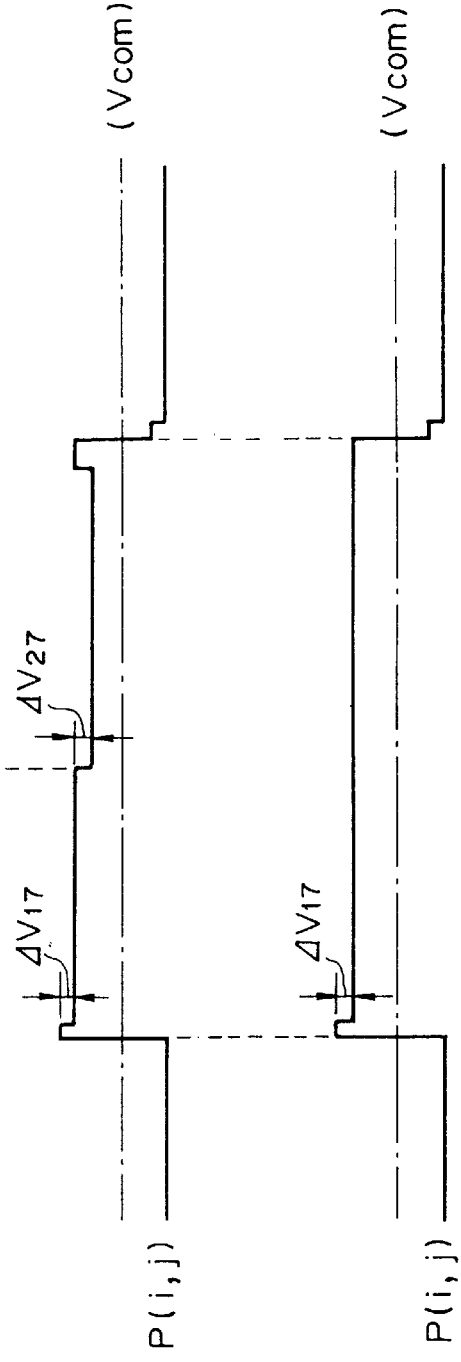

FIGS. 28A and 28B are illustrations same as those showing the pixel potential fluctuation due to the first mode of another embodiment shown in FIG. 22 and FIG. 28C is an illustration showing the pixel potential fluctuation due to the first mode of another embodiment of the present invention.

As shown n FIG. 28A, the potential of the pixel P(i,j) lowers by $\Delta V_{17}$ when the control signal CA rises and voltage lowers by $\Delta V_{27}$ when the control signal CA rises as shown in FIG. 28B. This phenomenon is caused by a feed-through voltage due to the parasitic capacitance of a TFT constituting the switching device $T_D$.

When assuming the parasitic capacitance between the gate and drain of a TFT as $C_{gd9}$, the capacitance of pixel L as $C_{lc9}$, the voltage amplitude of the control lines CA and CB as $V_{c9}$, the value of the holding capacitances $C_{19}$ and $C_{29}$ as $C_{x9}$, the above value $\Delta V_{27}$ is shown by the following equation (2).

$$\Delta V_{27} = (C_{gd9} - C_x)/(C_{gd9} + C_{1c9} + C_x) \times V_{c9} \qquad (2)$$

Therefore, by setting the value $C_x$ of the holding capacitances $C_{19}$ and $C_{29}$ to $C_x = C_{gd9}$, the numerator of the above equation approaches 0. Therefore, it is possible to decrease the value $\Delta V_{27}$ to 0.

FIG. 28C is an illustration showing the pixel potential when setting the value $C_x$ of the holding capacitances $C_{19}$ and $C_{29}$ to $C_x=C_{gd9}$. From this drawing, it is found that the pixel potential does not change even if the voltage of the control line CA (CB) falls. Therefore, even when using the control signal generation mode shown in the first mode of another embodiment, power consumption does not increase, and the liquid crystal layer L does not seize, or flicker does not occur.

Figure 29:
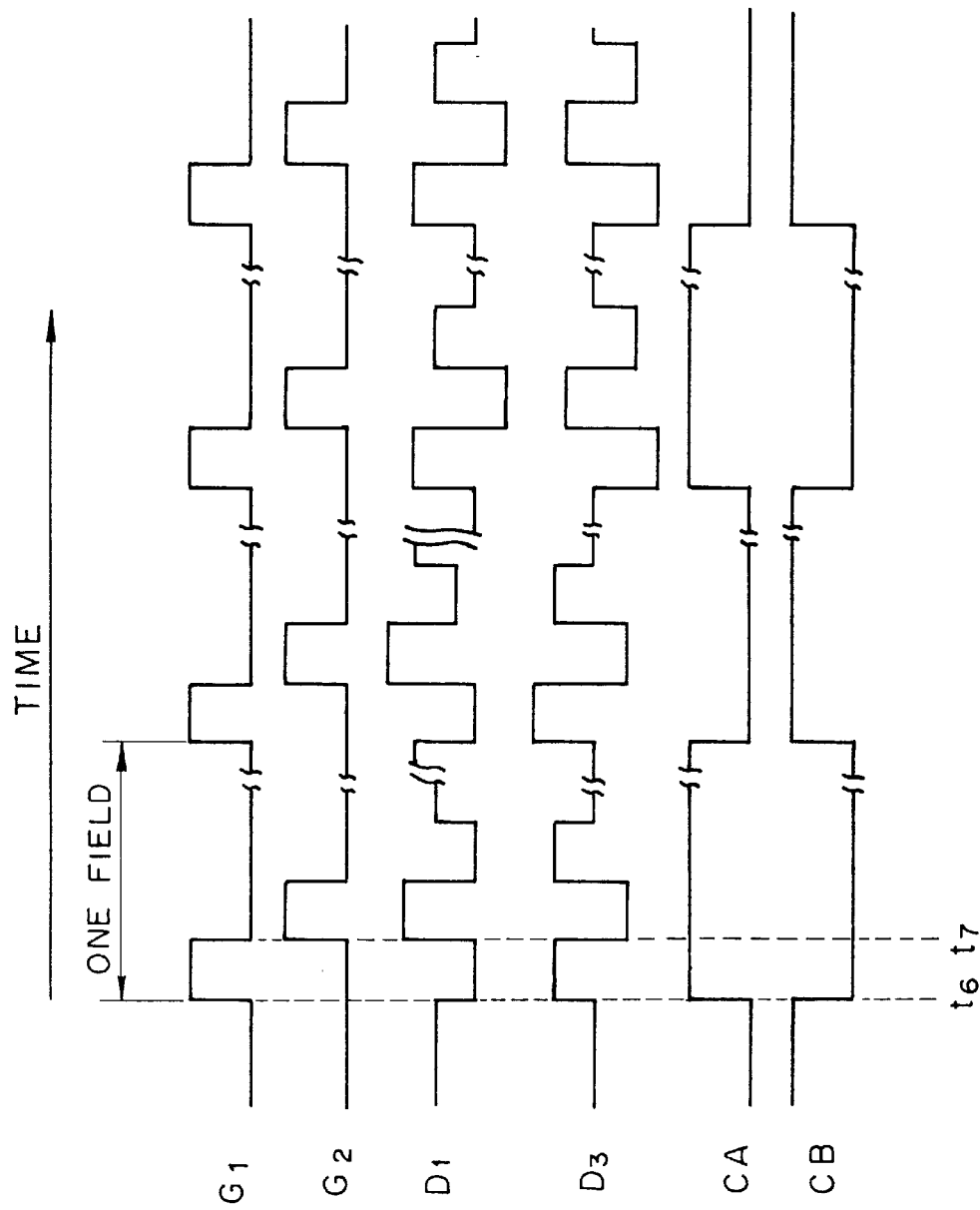
FIG. 29 is an illustration showing the generation mode of each signal in accordance with the fourth mode of another embodiment.

Then, the fourth mode of another embodiment is described below which performs a display operation by changing the generation mode of an image signal on the signal line Dj. In the case of this mode, each signal is generated by the generation mode shown in FIG. 29. This mode corresponds to a mode in which the generation mode of a gate signal and a control signal is equalized with that of the above first mode of another embodiment to supply image signals of different polarity between adjacent signal lines. This mode can be used for the liquid crystal display of the first mode of another embodiment of the present invention shown in FIG. 19 and the liquid crystal display of the third mode of another embodiment of the present invention shown in FIG. 27.

First, a control signal on the control line CA is set to H level in one horizontal scanning period between the times $t_6$ and $t_7$ to write image data in the pixels P(1,j) and P(1,j+3) located at the first-row control line CA side. The polarity of an image signal supplied in this case is made negative for the signal line $D_1$ and positive for the signal line $D_3$ as illustrated. Moreover, though not illustrated, image signals are supplied at polarities different from each other between adjacent signal lines such as −,+, −, +, . . . through signal lines $D_5$, $D_7$, $D_9$, $D_{11}$, . . .

Then, image data is written in the pixels P(2,j) and P(2,j+3) located at the second-row control line CA side starting with the time $t_7$. In this case, the polarity of an image signal is reversed on each signal line compared to the case of the above first row. Thus, the polarity of an image signal at the time of image data write of each row is made different for each signal line and also in the display operation in the next field, image signals are supplied at polarities of −, +, −, +, . . . through the signal lines $D_1$, $D_3$, $D_5$, $D_7$, . . . .

Then, in the case of the display operation in the still next field, the image signal polarity of each signal line of each row uses each polarity obtained by reversing the above polarities. That is image signals are supplied at polarities of +, −, +, −, . . . through the signal lines $D_1$, $D_3$, $D_5$, $D_7$, . . . Hereafter, reversal driving is performed by repeating the reversal of these polarities.

Figure 30A:
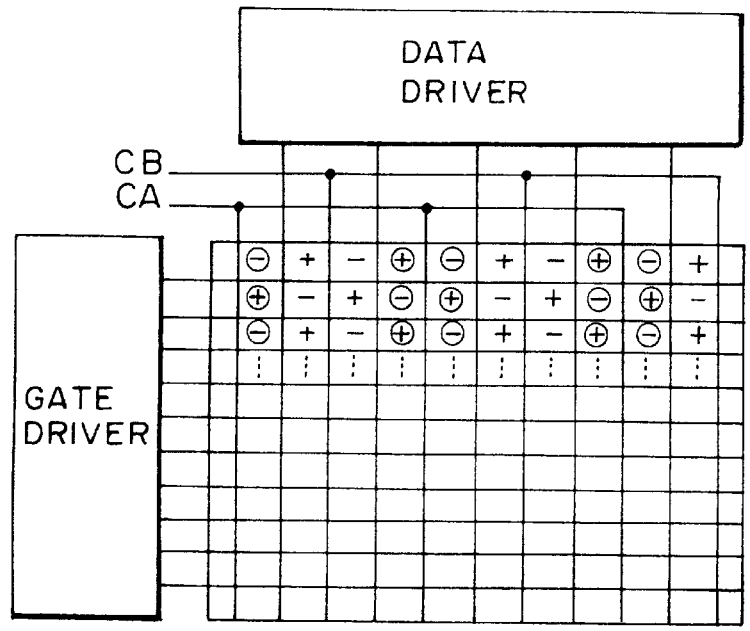
FIGS. 30A and 30B are illustrations schematically showing the pixels in which image data is written in accordance with the fourth mode of another embodiment.
Figure 30B:
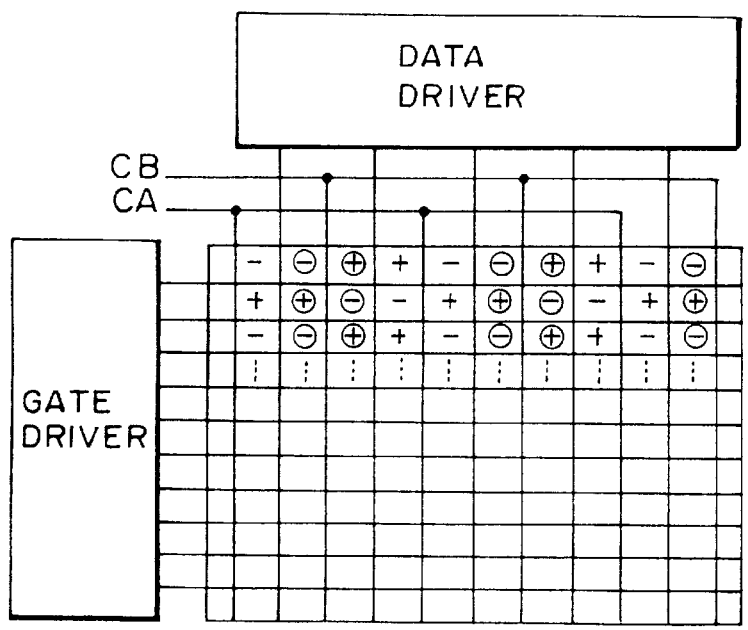

FIGS. 30A and 30B schematically show the pixels in which image data is written in each field by the above-described display operation. These drawings also show the pixels in which image data is written in accordance with the expression style same as those in FIGS. 21 and 24. The polarity distribution shown in FIG. 30 is closer to dot reversal compared to the polarity distributions shown in FIGS. 21 and 24. Therefore, according to the display operation by this mode, flicker becomes less remarkable and stroke also decreases compared to the case of display operations by the above first and second modes of another embodiment.

In the case of common reversal driving, the polarities of image signals at the same timing must be the same. Therefore, the potential of a counter electrode is fluctuated due to the capacitive coupling between a signal line and the counter electrode. This causes contrast to deteriorate and stroke to increase. Therefore, in the case of this embodiment, a cancel signal for canceling the above fluctuation of the counter electrode is superimposed on a control signal.

FIG. 31 shows the generation mode of each signal according to the fifth mode of another embodiment. In this case, a cancel signal is superimposed on a control signal in the above first mode of another embodiment.

This embodiment can be used for the liquid crystal display of the first mode of another embodiment of the present invention shown in FIG. 19 and the liquid crystal display of the third mode of another embodiment of the present invention shown in FIG. 27.

When display of a display field is first started at the time $t_8$, a control signal on the control line CA is set to H level to write image data in the pixels P(1,j) and P(1,j+3) located at the first-row control line CA side.

In this case, a cancel signal for canceling the fluctuation in counter electrode potentials due to positive-polarity image signal is superimposed on a control signal on the control line CB to be set to L level. That is, as shown by the control signal (CB) at the times $t_8$ and $t_9$ in the drawing, the control signal on the control line CB is generated by superimposing a constant negative-polarity voltage on a normal L-level signal. Thereby, the sum of control signals on the control lines CA and CB is made to have an opposite polarity to an image signal. In this case, the negative-polarity voltage denotes a voltage with negative polarity on the basis of a counter electrode potential. Moreover, it is necessary to properly set an amplitude for reversing the polarity of the image signal (e.g. approx. 4 to 10 V).

Moreover, when writing image data in the second-row pixels P(2,j) and P(2,j+3) starting with the time $t_9$, a control signal on the control line CB is generated by superimposing a constant positive-polarity voltage on a normal L-level signal. In this case, the positive-polarity voltage is a voltage on the basis of a counter electrode potential. Hereafter similarly, a voltage with a polarity opposite to that of an image signal is superimposed on a control signal in the control line CB.

Then, in the case of the display of the next display field starting with the time $t_{10}$, a control signal on the control line CB is set to H level to write image data in the pixels P(i,j+1) and P(i,j+2). In this case, a cancel signal same as the above is superimposed on a control signal on the control line CA to be set to L level.

As described above, by superimposing a cancel signal for preventing a counter electrode potential from fluctuating on a control signal, it is possible to prevent contrast from deteriorating or stroke from increasing. In this case, it is necessary to use a cancel signal to make the sum of control signals on the control lines CA and CB have a polarity opposite to that of an image signal like the above cancel signal. Therefore, superposition of a cancel signal is not restricted to the above mode. It is possible to superimpose a cancel signal on a control signal to be set to H level or on either control signal.

According to the above fifth mode of another embodiment, the fluctuation in counter electrode potentials is prevented by a cancel signal. In the case of the above fifth mode of another embodiment, however, it is impossible to completely eliminate fluctuation in counter electrode potentials due to influence of an image-signal level because the cancel signal is provided with a constant positive- or negative-polarity voltage. Therefore, in the case of the sixth mode of another embodiment, means is described which specifically determines a proper cancel signal and superimposes the signal on a control signal.

Figure 32:
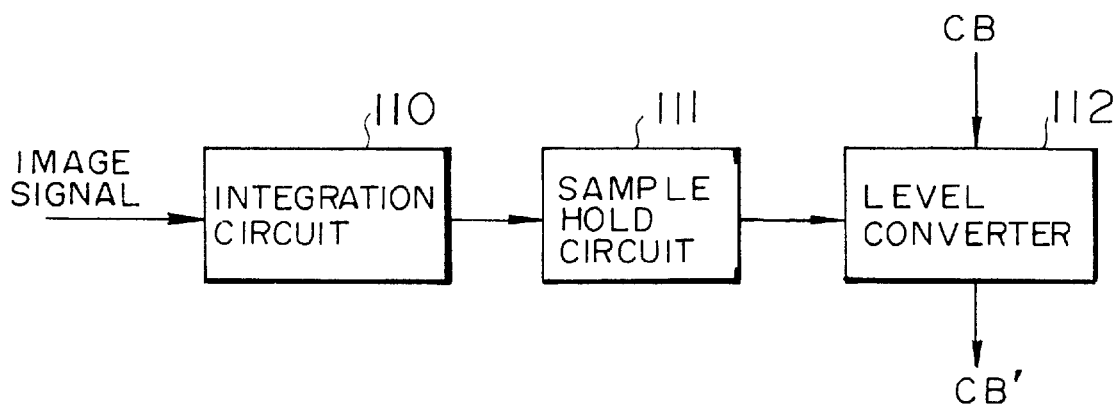
FIG. 32 is a block diagram showing the structure of means for computing and superposing a cancel signal in the sixth mode of another embodiment.

FIG. 32 is a block diagram showing the structure of means for computing and superimposing the above cancel signal. In FIG. 32, symbol 110 denotes an integration circuit which integrates image signals included in one horizontal scanning period and successively outputs integrated values to a sample hold circuit 111. The sample hold circuit 111 samples and holds the integrated values successively output for one horizontal scanning period and continuously outputs them to a level conversion circuit 112. The level conversion circuit 112 converts the levels of control signals on the control line CB (or CA) in accordance with the integrated values received from the sample hold circuit 111.

In this case, level conversion by the level conversion circuit 112 is selected so that fluctuation in counter electrode potentials can be properly removed in accordance with the numbers and sizes (widths) of signal lines $D_j$ and control lines CA and CB. For example, as shown in FIG. 19, when the number of signal lines $D_j$ equals the sum of the numbers of control lines CA and CB and the widths of the signal lines and control lines are equal, level conversion is performed in which the average value of image signals is computed from the integrated values and a voltage two time larger than the average value and having an opposite polarity to the image signals is superimposed on a control signal. In this case, the magnitude of a cancel signal is made two times larger than the average value because the number of control lines on which the cancel signal is superimposed comes to ½ the number of signal lines.

Figure 33:
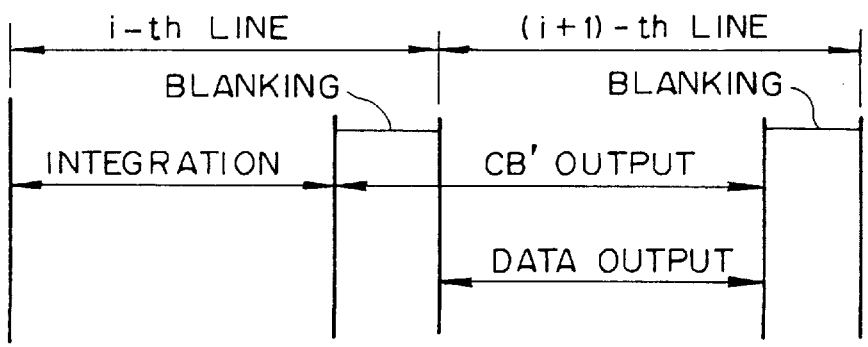
FIG. 33 is an illustration for explaining operations of means for computing and superposing a cancel signal.

In the case of the above structure, as shown in FIG. 33, while display of an i-th row is performed, image signals on the next (i+1)-th row are integrated by an integration circuit 110 (period of "integration" in FIG. 33). In this case, because the image signals are supplied in the effective display period of one horizontal scanning period, the integrating operation is completed before one horizontal scanning period is completed as shown in FIG. 33. Moreover, when the integrating operation is completed, the then obtained integrated value is output to the sample hold circuit 111 and outputting of the value to the level conversion circuit 112 is started.

Thereby, the level conversion circuit 112 level-converts a control signal in accordance with the integrated value and starts outputting the level-converted control signal after the effective display period of the i-th row is completed ("CB' output" in FIG. 33). Then, the display of th e(i+1)-th row is started ("data output" in FIG. 33).

As described above, according to this embodiment, a cancel signal is computed at any time by considering the level of an image signal. Therefore, the influence of the level of an image signal can be eliminated and the fluctuation in counter electrode potentials can be completely removed.

DESCRIPTION OF THE PREFERRED EMBODIMENT

First Embodiment

Figure 16:
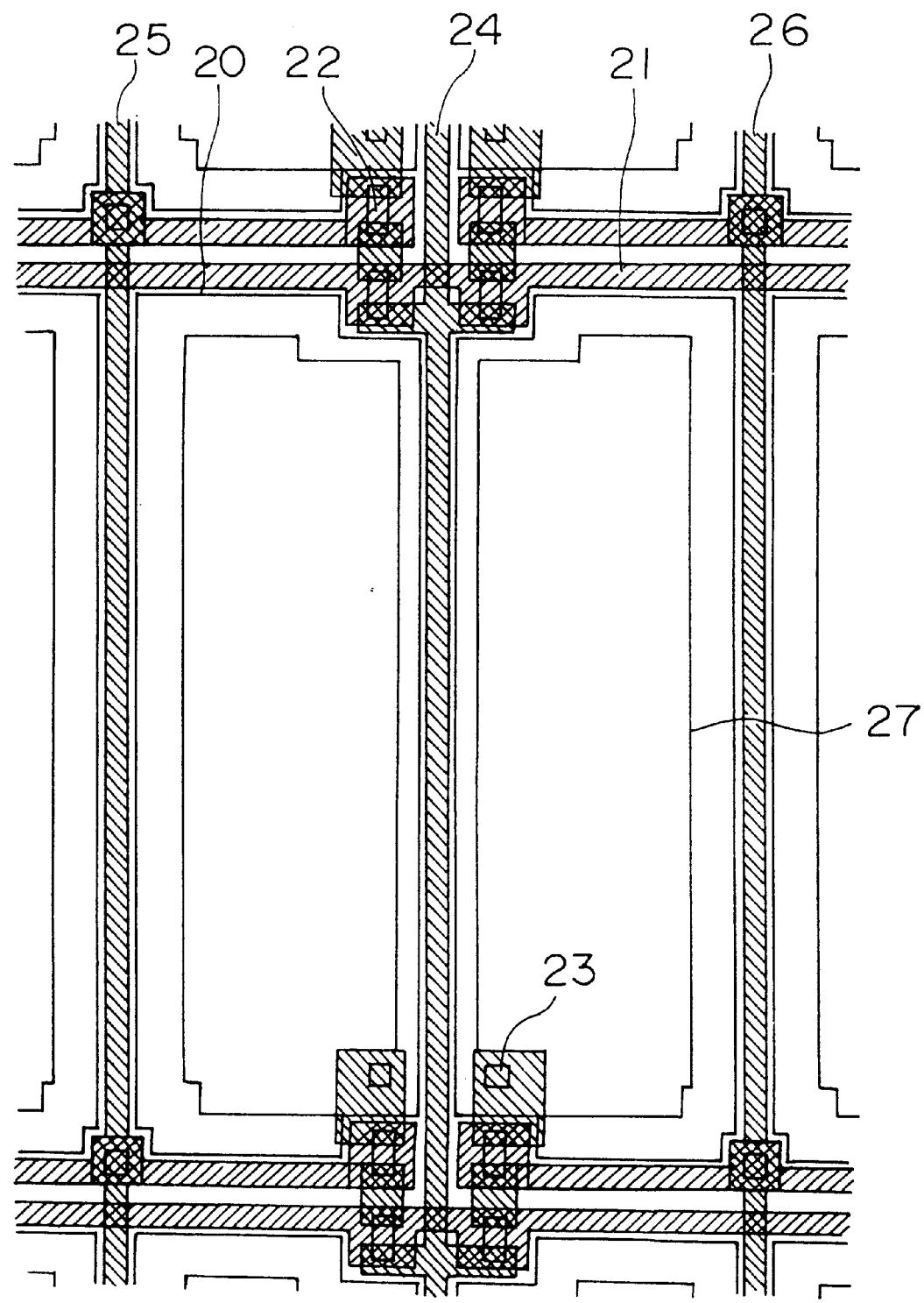
FIG. 16 is a layout drawing more specifically showing the constitution of the pixels at a part of the liquid crystal panel shown in FIG. 1.

FIG. 16 shows a specific example of the liquid crystal display of the first mode of one embodiment of the present invention. FIG. 16 is a layout drawing more specifically showing the constitution of the pixels at a part of the liquid crystal panel shown in FIG. 1, assuming a 4-in VGA (Video Graphic Array) with 480 (horizontal direction)×640 (vertical direction)×3 (R, G, B) pixels.

In FIG. 16, symbol 20 denotes a pixel electrode. Liquid crystals are sealed between the pixel electrode 20 and the above counter electrode at each pixel. Symbol 21 denotes a gate line which corresponds to the scanning line Gi in the above one embodiment. Symbol 22 denotes an amorphous silicon piece and 23 denotes a contact hole, both of which form a line comprising the switching devices $T_G$, $T_{CA}$, and $T_{CB}$. Symbol 24 denotes a data line which corresponds to the signal line Dj. Symbols 25 and 26 denote control lines, in which the line 25 corresponds to the control line CA and the line 26 corresponds to the control line CB. Symbol 27 denotes an opening of a pixel.

In FIG. 16, the pixel pitch is 43 μm×129 μm. Moreover, the numerical aperture comes to 53% in the case of this layout.

Second Embodiment

Figure 17:
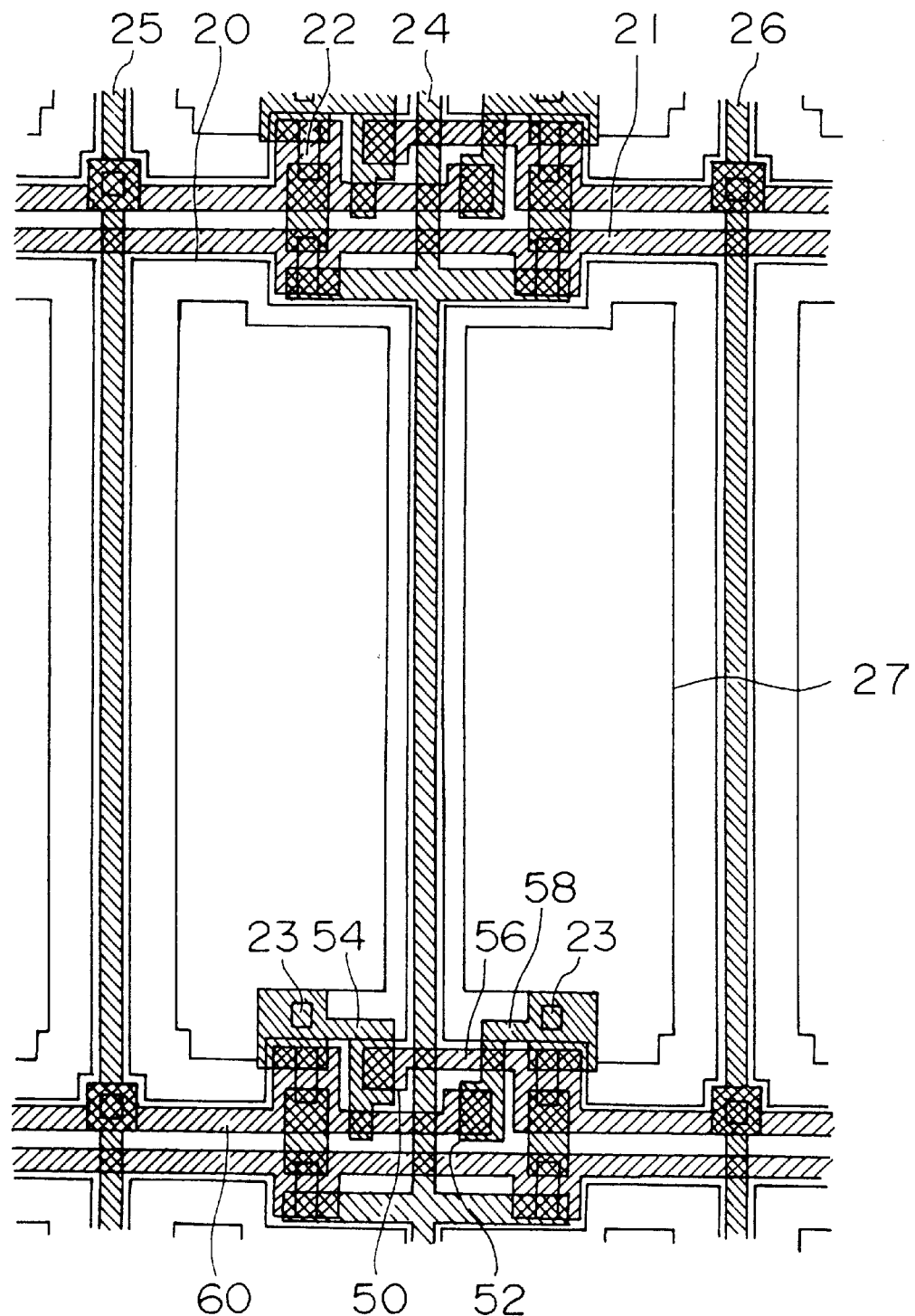
FIG. 17 is a layout drawing more specifically showing the constitution of the pixels at a part of the liquid crystal panel shown in FIG. 9.

FIG. 17 is a layout drawing showing a specific example of the liquid crystal display of the third mode of one embodiment of the present invention. The layout drawing of the second embodiment of the present invention shown in FIG. 17 is different from the layout drawing of the first embodiment of the present invention shown in FIG. 16 in that holding capacitances 50 and 52 are included. An electrode 54 electrically connected with the contact hole 23 and an electrode 56 electrically connected with the control line 26 form two electrodes of the holding capacitor 50 and an electrode 58 electrically connected with the contact hole 23 and an electrode 60 electrically connected with the control line 26 form two electrodes of the holding capacitor 52. An insulting film is formed between the electrodes 54 and 56 and between the electrodes 58 and 60 respectively.

Third Embodiment

Figure 18:
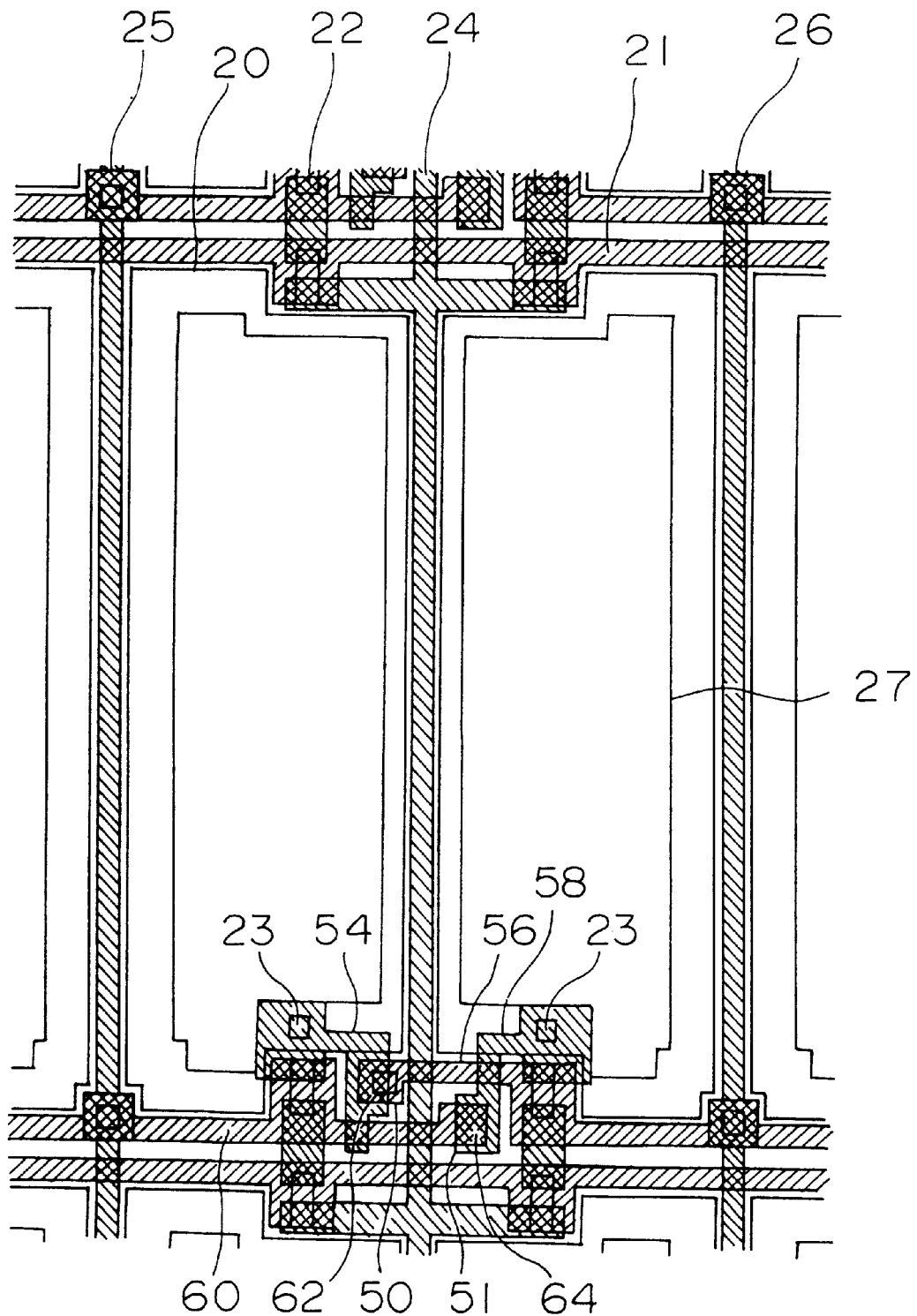
FIG. 18 is another layout drawing more specifically showing the constitution of the pixels at a part of the liquid crystal panel shown in FIG. 9.

FIG. 18 is a layout drawing showing an specific example of the liquid crystal display of the third mode of one embodiment of the present invention. The layout drawing of the third embodiment of the present invention shown in FIG.18 is different from the layout drawing of the second embodiment of the present invention shown in FIG. 17 in that amorphous silicon pieces 62 and 64 are formed between the electrodes 54 and 56 and between the electrodes 58 and 60 respectively. It is possible to form the amorphous silicon pieces 62 and 64 by the same manufacturing process as that of a TFT when forming the holding capacitances 50 and 52 because the switching devices $T_G$, $T_{CA}$, and $T_{CB}$ are formed with a TFT and the amorphous silicon piece 22 is also formed on the TFT.

Moreover, because the sizes of the holding capacitors 50 and 52 can be properly set according to the dimensions of the amorphous silicon pieces 62 and 64, it is possible to easily fabricate a capacitor meeting the above equation (1). Moreover, in this case, the fact that the same structure as that of the switching devices $T_G$, $T_{CA}$, and $T_{CB}$ (that is, the fact that an amorphous silicon piece is formed between electrodes) is preferable because characteristics such as voltage dependence and the like are the same between the holding capacitors 50 and 52 on one hand and the switching devices $T_G$, $T_{CA}$, and $T_{CB}$ on the other.

Fourth Embodiment

Figure 34:
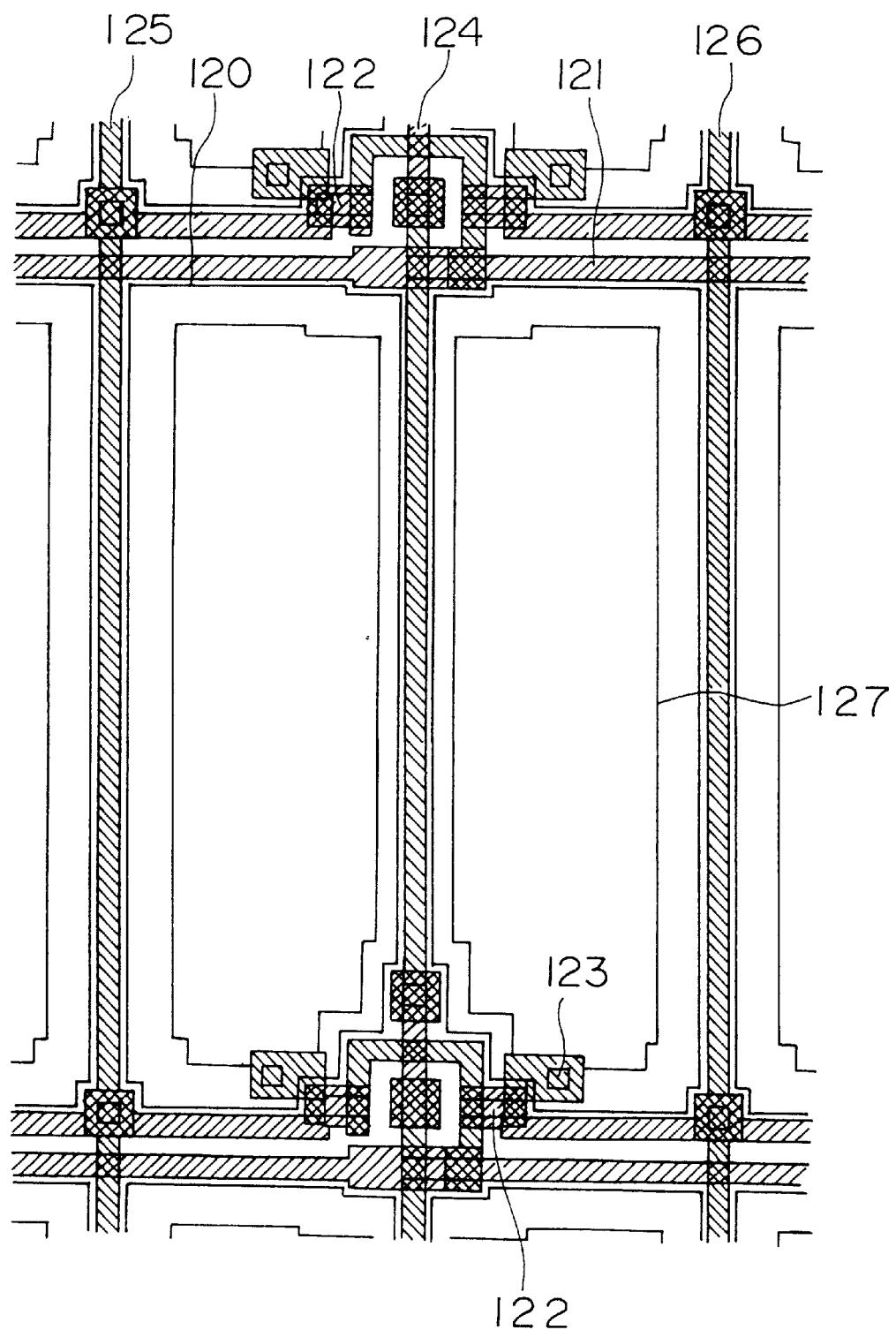
FIG. 34 is a layout drawing more specifically showing the constitution of the pixels at a part of the liquid crystal panel shown in FIG. 19.

FIG. 34 shows a specific example of the liquid crystal display of the first mode of another embodiment of the present invention. FIG. 34 is a layout drawing more specifically showing the constitution of the pixels at a part of the liquid crystal display shown in FIG. 19, assuming a 4-in VGA (Video Graphic Array) of 480 (horizontal direction)× 640 (vertical direction)×3 (R, G, B) pixels.

In FIG. 34, symbol 120 denotes a pixel electrode. Liquid crystal is sealed between the pixel electrode 120 and the above counter electrode at each pixel. Symbol 121 denotes a gate line which corresponds to the scanning line Gi of the above mode. Symbol 122 denotes an amorphous silicon piece and 123 denotes a contact hole, both of which form a line comprising the switching devices $T_D$, $T_{CA}$, and $T_{CB}$. Symbol 124 denotes a data line which corresponds to the signal line Dj. Symbols 125 and 126 denote control lines, in which the line 125 corresponds to the control line CA and the line 126 corresponds to the control line CB. Symbol 127 denotes an opening at a pixel. The pixel pitch in FIG. 34 is 43 μm×129 μm.

Fifth Embodiment

Figure 35:
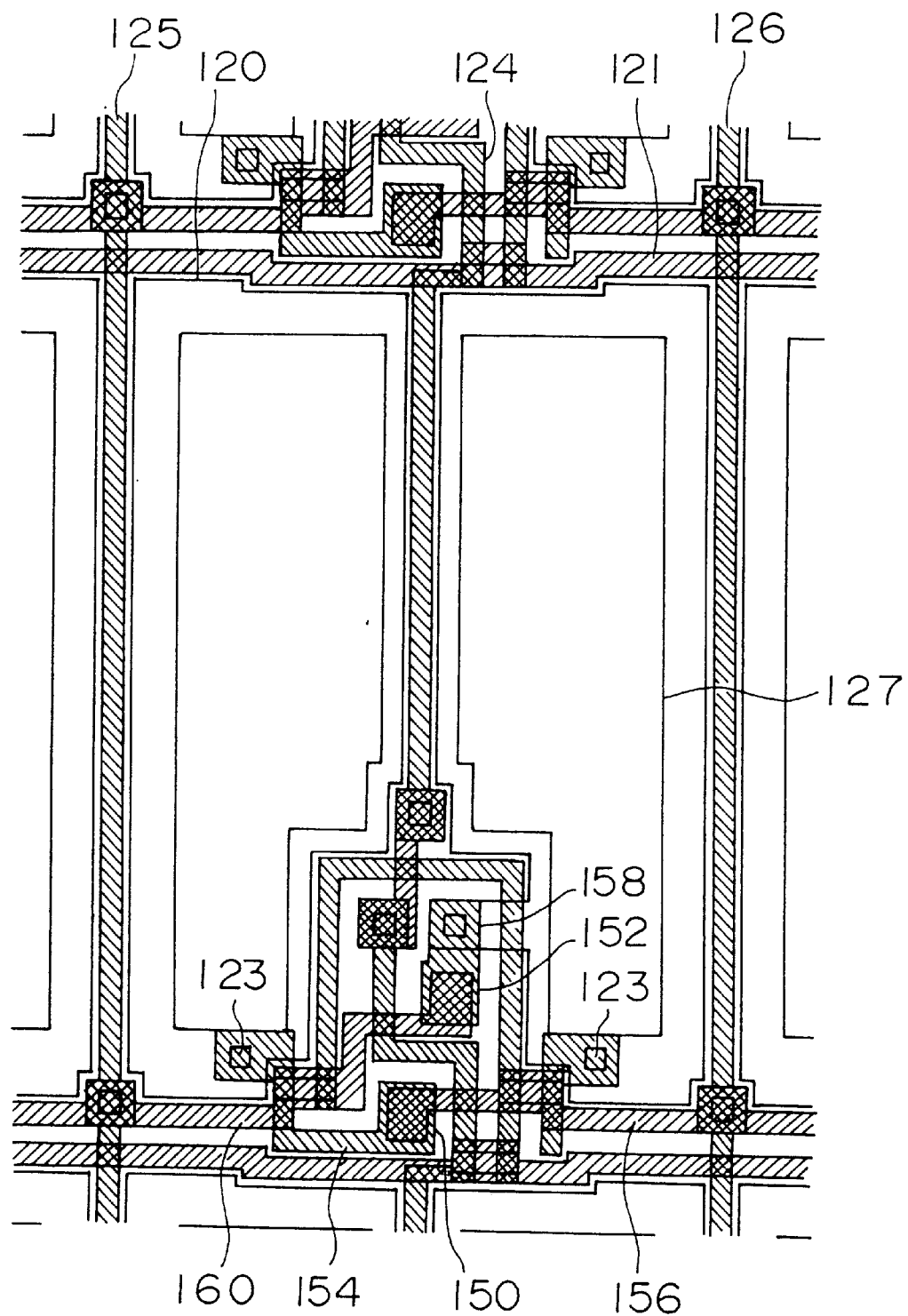
FIG. 35 is a layout drawing more specifically showing the constitution of the pixels at a part of the liquid crystal panel shown in FIG. 27.

FIG. 35 is a layout drawing showing a specific example of the liquid crystal display of the third mode of another embodiment of the present invention. The layout drawing of the fifth embodiment of the present invention shown in FIG. 35 is different from the layout drawing of the fourth embodiment of the present invention shown in FIG. 34 in that holding capacitors 150 and 152 are included. An electrode 154 electrically connected with a contact hole 123 and an electrode 156 electrically connected with the control line 126 form two electrodes of the capacitor 150 and an electrode 158 electrically connected with the contact hole 123 and an electrode 160 electrically connected with the control line 125 form two electrodes of the holding capacitor 152. An insulating film is formed between the electrodes 154 and 156 and between the electrodes 158 and 160 respectively.

Sixth Embodiment

Figure 36:
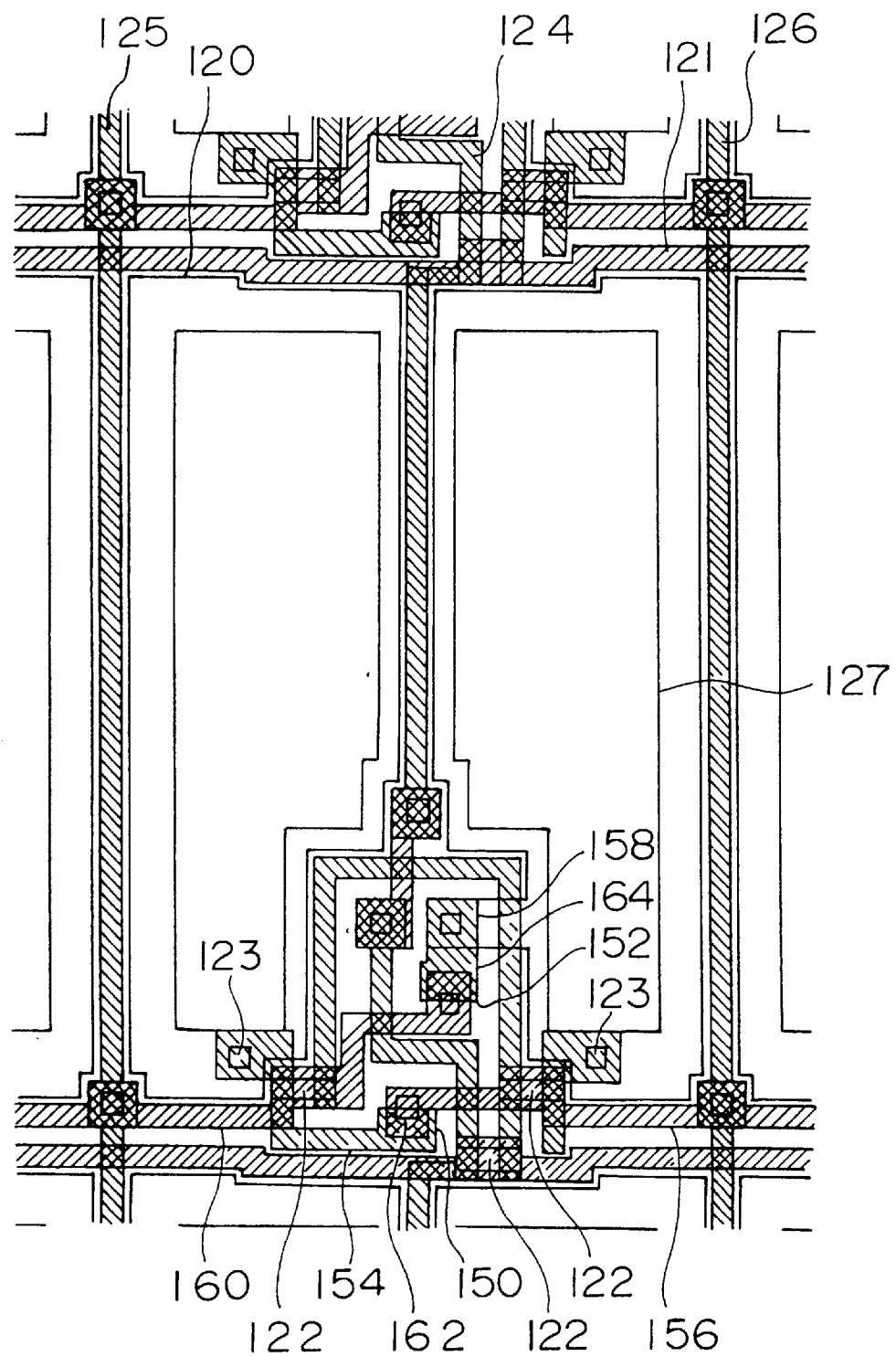
FIG. 36 is a layout drawing more specifically showing the constitution of the pixels at a part of the liquid crystal panel shown in FIG. 27.
Figure 37:
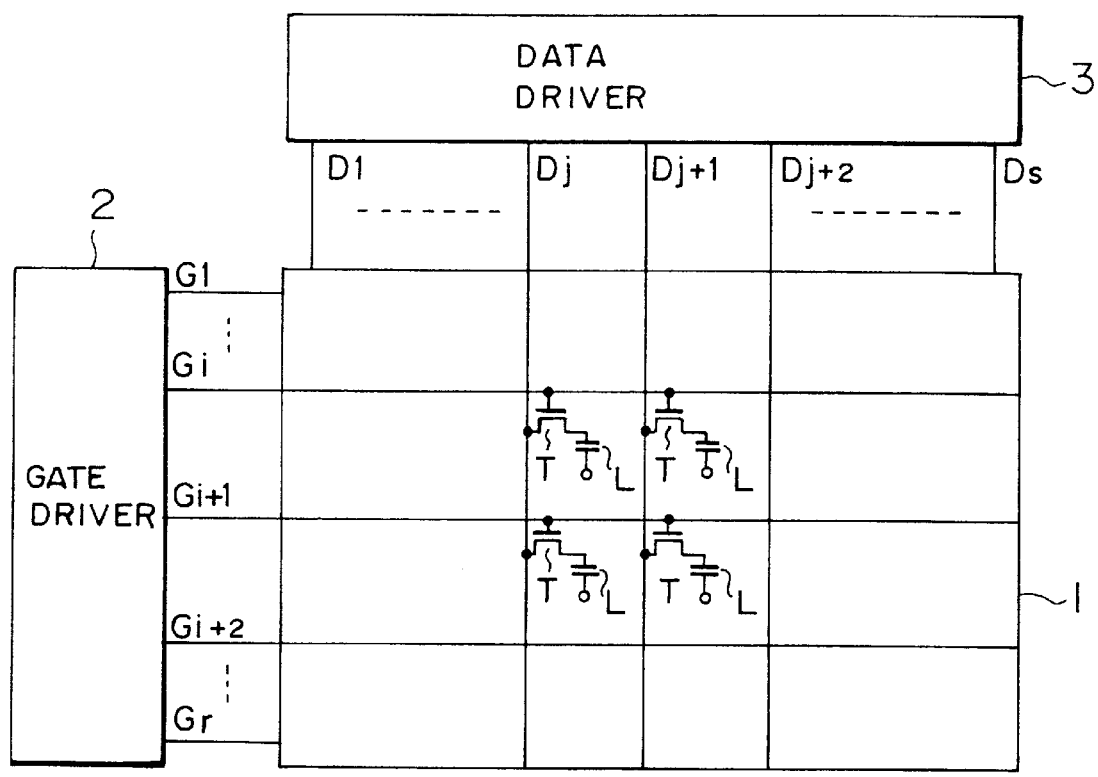
FIG. 37 is an illustration showing the structure of a conventional liquid crystal display.
Figure 38:
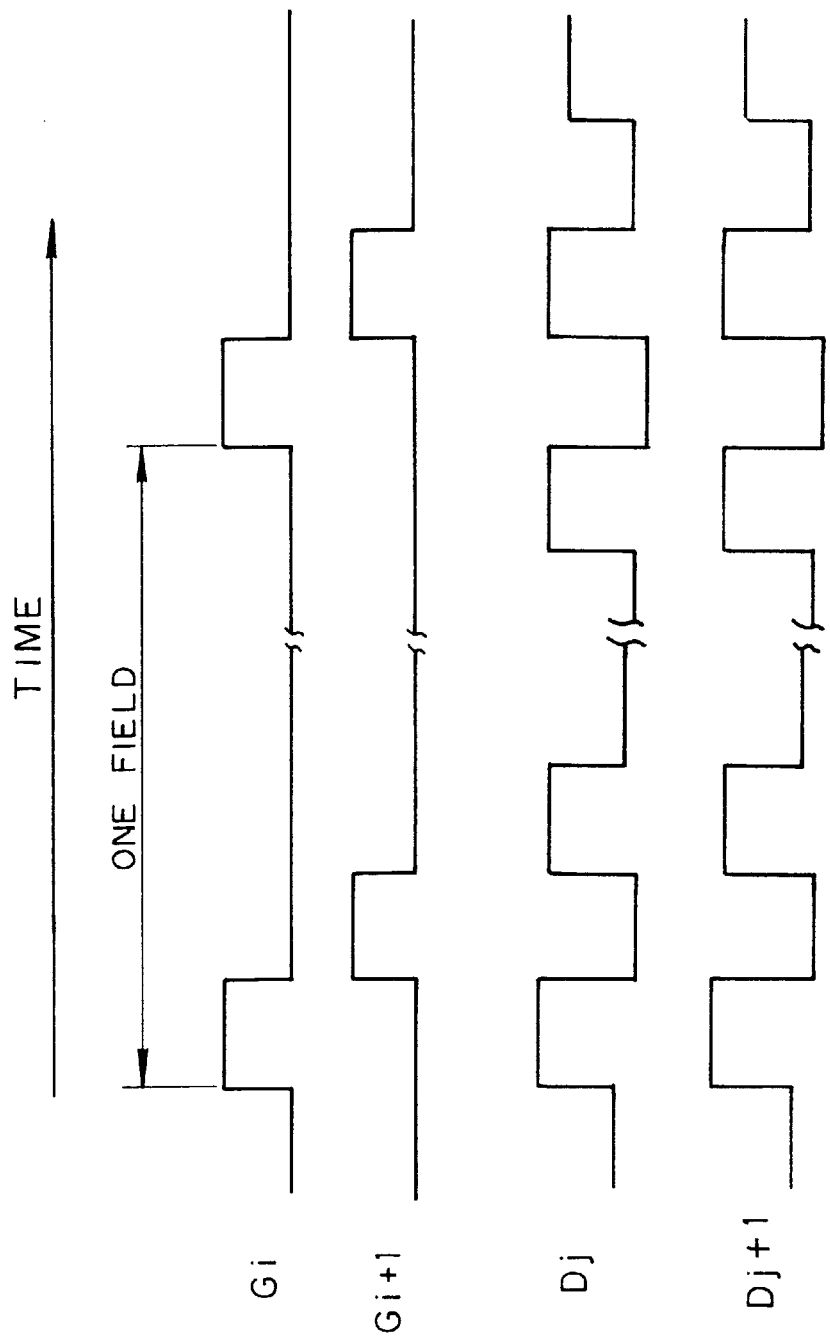
FIG. 38 is an illustration showing the drive timing of a scanning line and a signal line in a conventional liquid crystal display.

FIG. 36 is a layout drawing showing an specific example of the liquid crystal display of the third mode of another embodiment of the present invention. The layout drawing of the sixth embodiment of the present invention shown in FIG. 36 is different from the layout drawing of the fifth embodiment of the present invention shown in FIG. 35 in that amorphous silicon pieces 162 and 164 are formed between the electrodes 154 and 156 and between the electrodes 158 and 160 respectively. The amorphous silicon pieces 162 and 164 can be formed in the same manufacturing process as that of a TFT when forming the holding capacitors 150 and 152 because the switching devices $T_D$, $T_{CA}$, and $T_{CB}$ in FIG. 27 are formed with a TFT and the amorphous silicon piece 122 is also formed on the TFT. Moreover, the sizes of the holding capacitors 150 and 152 can properly be set according to the dimensions of the amorphous silicon pieces 162 and 164, it is possible to easily fabricate a capacitor meeting the above equation (2). Moreover, in this case, the fact of the same structure as that of the switching devices $T_D$, $T_{CA}$, and $T_{CB}$ (that is, the fact that an amorphous silicon piece is formed between electrodes) is preferable because characteristics such as the voltage dependence and the like are the same between the holding capacitors 150 and 152 on one hand and the switching devices $T_D$, $T_{CA}$, and $T_{CB}$ on the other.

As described above, the present invention makes it possible to select a pixel in which image data is written in accordance with a signal supplied to a control line because the control line parallel with a signal line is provided for a liquid crystal panel to switch on/off a second switching device in accordance with the signal supplied to the control line. Thereby, it is possible to decrease the number of signal lines for the number of pixels and avoid narrowing of the pitch of the terminal portion of a data driver.

Moreover, because the number of signal lines can be decreased, is possible to reduce power consumption and prevent the size of a liquid crystal display from increasing. Furthermore, it is possible to greatly decrease the cost of a liquid crystal display.

In particular, because predetermined sets of control lines are alternately driven whenever scanning line drive is shifted, the relative timing between the scanning line drive and the control line drive is equalized for all scanning lines. Thereby, it is possible to avoid differences in effective voltage of a signal to be applied to each pixel and prevent luminance unevenness in raster display from occurring.

Moreover, because adjacent signal lines are driven by signals with different polarities, it is possible to perform reversal driving close to dot reversal and control the occurrence of flicker or stroke.

Furthermore, because a voltage for disabling a potential based on a signal line is superimposed on a control line, it is possible to control fluctuation in counter electrode potentials even when using common reversal driving and prevent contrast from deteriorating and stroke from increasing. Furthermore, because a voltage based on the average value of voltages applied to the signal lines is superimposed, it is possible to eliminate the influence of signal level on a signal line and completely remove fluctuation in counter electrode potentials.

Furthermore, because a holding capacitor is added which prevents the voltage applied to a pixel from fluctuating when the voltage of a control line fluctuates, it is possible to improve luminance unevenness and control power consumption because it is unnecessary to apply a voltage for compensating a fluctuating voltage.

What is claimed is:

1. A liquid crystal display comprising:
   a plurality of scanning lines and a plurality of signal lines arranged to form a matrix;
   a plurality of control lines provided alternately with and in parallel with said signal lines;
   a first switching device disposed in each of a plurality of image display units, said image display units formed in all regions enclosed by one of said signal lines, one of said control lines adjacent to said signal line and adjacent scanning lines, said first switching device supplying each image display unit with a signal from each signal line defining each image display unit, said first switching device being switched on or off by a driving signal supplied to one of said adjacent scanning lines so as to supply each image display unit with a driving signal supplied to each signal line; and
   a second switching device connected in series with said first switching device, said second switching device being switched on or off by a driving signal supplied to each control line so that the supply of said driving signal supplied to each control line for each image display unit is controlled;
   wherein control signals supplied to control lines controlling second switching devices contained in adjacent image display units bounded by the same scanning lines are turned on or off by said control signals, said control signals supplied at different times between one image display unit and said adjacent image display unit.

2. A liquid crystal display according to claim 1, wherein said control lines are composed of a first set of control lines connected in common and a second set of control lines connected in common, said first set of control lines alternating between successive signal lines with said second set of control lines.

3. A liquid crystal display according to claim 1, wherein said control lines are composed of a first set of control lines connected in common and a second set of control lines connected in common, said first set of control lines alternating between successive signal lines with said second set of control lines and said first set of control lines operational to drive each of said control lines in alternation with said second set of control lines, wherein said scanning lines are driven and said driving of said control lines alternate when said driving of said scanning lines is shifted from one of said scanning lines to another of said scanning lines.

4. A liquid crystal display according to claim 1, wherein said control lines are composed of a first set of control lines connected in common and a second set of control lines connected in common, said first set of control lines alternating between successive signal lines with said second set of control lines and said first set of control lines operational to drive each of said image display units in alternation with said second set of control lines, and wherein each pair of adjacent signal lines is driven by signals having different polarities.

5. A liquid crystal display according to claim 1, wherein a voltage for disabling a potential based on said signal lines is superimposed on said control lines.

6. A liquid crystal display according to claim 5, wherein the average value of the voltages to be applied to said signal lines is computed and a voltage according to said average value is superimposed on said control lines.

7. A liquid display according to claim 2, further comprising:

a plurality of holding capacitors, said plurality of holding capacitors consisting of a first set of holding capacitors and a second set of holding capacitors, wherein said first set of said holding capacitors is connected between one of said second switching devices and one of said second set of control lines, said one of said second switching devices connected with said first set of control lines and one of said first switching devices, said one of said first switching devices in addition connected with one of said signal lines; and said second set of said holding capacitors is connected between one of said second switching devices and one of said first set of control lines, said one of said second switching devices connected with said second set of control lines and another of said first switching devices, said another of said first switching devices in addition connected with said one of said signal lines.

8. A liquid crystal display comprising:

a plurality of scanning lines and a plurality of signal lines arranged to form a matrix;

a plurality of control lines provided alternately with and in parallel with said signal lines;

a pair of first switching devices disposed in each of a plurality of image display units, said image display units formed in all regions enclosed by adjacent control lines and adjacent scanning lines, said pair of first switching devices having ends, wherein said one of said ends of one of said first switching devices connected with one of said adjacent control lines, one of said ends of the other of said first switching devices connected with the other of said adjacent control lines, and the other ends of said first switching devices connected with each other; and a second switching device connected between said other ends of said pair of first switching devices and a signal line interposed between said adjacent control lines, said second switching device being switched on by a driving signal supplied to one of said adjacent scanning lines defining said image display unit so that a signal supplied to said signal line interposed between said adjacent control lines is supplied to said pair of first switching devices;

wherein one of said pair of first switching devices is switched on or off by control signals supplied to said adjacent control line connected to said one of said pair of first switching devices and the other of said pair of first switching devices is switched on or off by control signals supplied to the other of said adjacent control line connected to said other of said pair of first switching devices, said control signals being supplied at different times to said adjacent control lines.

9. A liquid crystal display according to claim 8, wherein said control lines are composed of a first set of control lines connected in common and a second set of control lines connected in common, said first set of control lines alternating between successive signal lines with said second set of control lines.

10. A liquid crystal display according to claim 8, wherein said control lines are composed of a first set of control lines connected in common and a second set of control lines connected in common, said first set of control lines alternating between successive signal lines with said second set of control lines and said first set of control lines operational to drive each of said control lines in alternation with said second set of control lines, wherein said scanning lines are driven and said driving of said control lines alternate when said driving of said scanning lines is shifted from one of said scanning lines to another of said scanning lines.

11. A liquid crystal display according to claim 8, wherein said control lines are composed of a first set of control lines connected in common and a second set of control lines connected in common, said first set of control lines alternating between successive signal lines with said second set of control lines and said first set of control lines operational to drive each of said image display units in alternation with said second set of control lines, and wherein each pair of adjacent signal lines is driven by signals having different polarities.

12. A liquid crystal display according to claim 8, wherein a voltage for disabling a potential based on said signal lines is superimposed on said control lines.

13. A liquid crystal display according to claim 12, wherein the average value of the voltages to be applied to said signal lines is computed and a voltage according to said average value is superimposed on said control lines.

14. A liquid crystal display according to claim 9, further comprising:

a plurality of holding capacitors, said plurality of holding capacitors consisting of a first set of holding capacitors and a second set of holding capacitors, wherein said first set of said holding capacitors is connected between one of said second switching devices and one of said second set of control lines, said one of said second switching devices connected with said first set of control lines and one of said first switching devices, said one of said first switching devices in addition connected with one of said signal lines; and said second set of said holding capacitors is connected between one of said second switching devices and one of said first set of control lines, said one of said second switching devices connected with said second set of control lines and another of said first switching devices, said another of said first switching devices in addition connected with said one of said signal lines.

* * * * *